United States Patent [19]
Yoshihara et al.

[11] Patent Number: 6,081,838
[45] Date of Patent: Jun. 27, 2000

[54] METHOD FOR ACCESS CONTROL ON MIB IN OSI MANAGEMENT

[75] Inventors: Kiyohito Yoshihara; Hiroki Horiuchi; Keizo Sugiyama; Sadao Obana, all of Tokyo, Japan

[73] Assignee: Kokusai Denshin Denwa Co., Ltd., Tokyo, Japan

[21] Appl. No.: 09/035,017

[22] Filed: Mar. 5, 1998

[30] Foreign Application Priority Data

Mar. 5, 1997 [JP] Japan ..................... 9-050074

[51] Int. Cl.⁷ ............................... G06F 15/173
[52] U.S. Cl. ............................... 709/223; 707/2
[58] Field of Search ..................... 709/223, 224, 709/229, 226, 225; 710/17, 18; 719/39, 47, 51; 713/201, 202; 707/2, 3, 6, 9, 40, 103

[56] References Cited

U.S. PATENT DOCUMENTS 5,317,742  5/1994  Bapat ..................... 395/700
5,586,255  12/1996  Tanaka et al. ............. 395/200.01

OTHER PUBLICATIONS

April Chang, "ISO/CCITT and Internet Management Coexistence;" ISO/CCITT to Internet Management Proxy http://snad.ncsl.nist.gov/pub/ccm/documents/draft.chang–iimc–proxy–04.txt, Feb. 1994.
Lakshmi Ramau, "CMISE Functions and Services," http://www.comsoc.org/pubs/surveys/raman/raman.html, May 1993.

*Primary Examiner*—Mehmet B. Geckil

[57] ABSTRACT

The managed object instance is used as access control unit, then access denial and permission are quickly decided. After a pre-process to the naming tree which is an object of access control, MOI included within every scope which can be designated by the management operation is obtained. At every issue of the management operation, access denial and permission are decided by using the data obtained in the pre-process. When the configuration of the naming tree is changed, the data are easily and rapidly revised, then the access control is adaptive to the dynamic change of the naming tree.

20 Claims, 17 Drawing Sheets

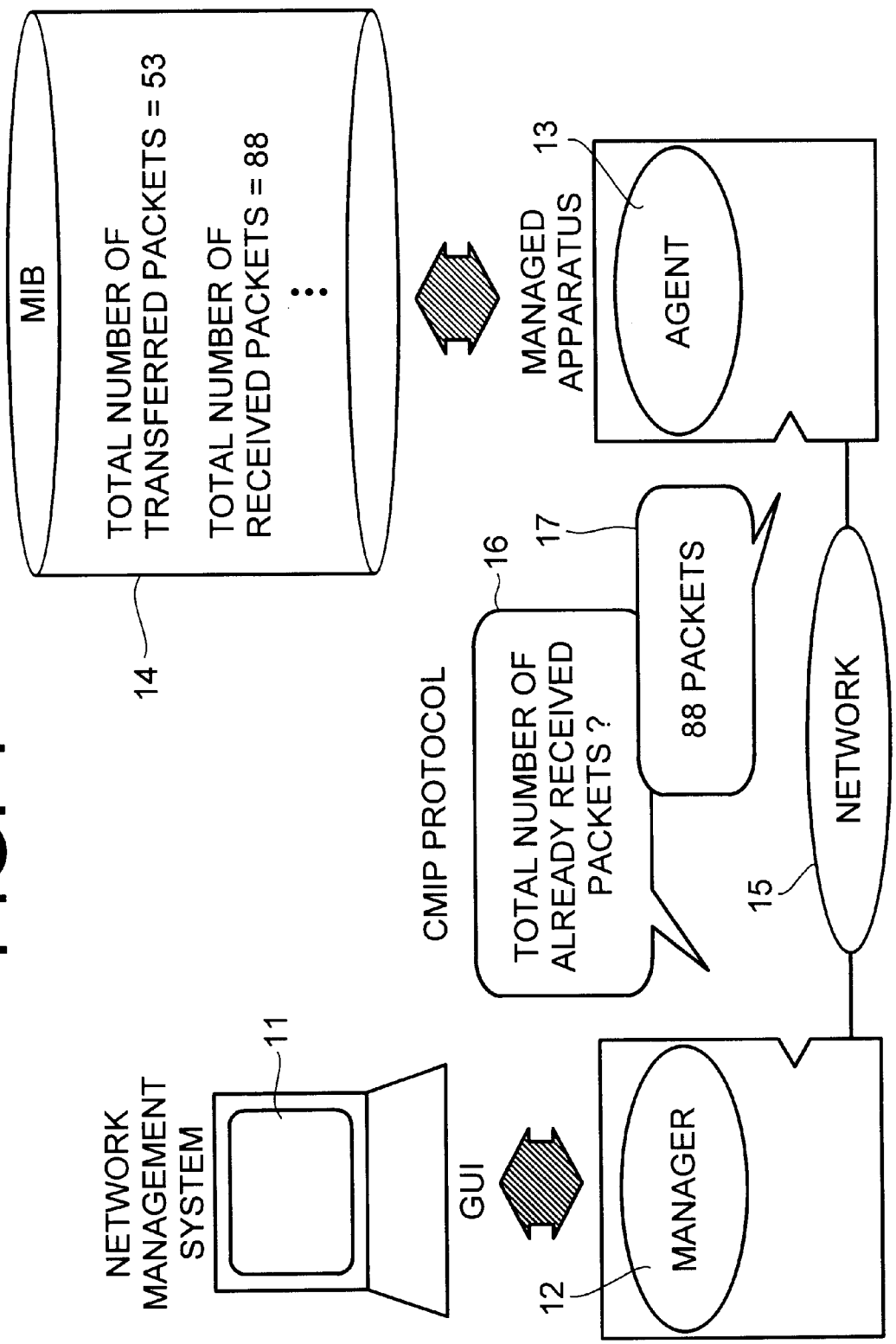

BASE TO 2nd LEVEL

WHOLE SUBTREE

BASE OBJECT

3rd LEVEL ONLY

METHOD FOR ACCESS CONTROL ON MIB IN OSI MANAGEMENT

FIELD OF THE INVENTION

This invention relates to a method for access control on MIB (Management Information Base) in OSI (Open System Interconnection) Management. Specifically, this invention relates to an access control method in which a management object instance is used as an access unit. Furthermore, this invention relates to a method for converting an identification name of MOI (Management Object Instance), a method for enumeration of some scope of MOI, a method for enumeration of a target of MOI and a method for detecting an intersection of MOI.

BACKGROUND OF THE INVENTION

Words on a tree, a network management based on an OSI management, MOI and a name tree, scope and target, and an abstract of ITU-T recommendation on access control method are described.

(Words on a tree)

Words such as "parent" on a tree are described.

A set having one or more top point is called as a tree if following conditions ① and ② are satisfied.

① A set T has a specific top point called as a root.

② A set T of tops except for the root is divided to a vacant set or one or more trees $T_1 \ldots , T_m$ which have no common set each other. These sets are called as a directly partial tree.

A root of a tree having no directly partial tree is called a leaf. A top point which is not a root and not a leaf is called a inner point. FIG. 19 shows a tree T which has nine top points indicated by circles 0~8. In FIG. 19, the top point 0 is a root. There are two directly partial trees $T_1, T_2$ in the tree T. One directly partial tree $T_1$ comprises one top point 1, another directly partial tree $T_{21}$ comprises top points 2,3,4, 5,6,7 and 8. Because the tree $T_1$ has no directly partial tree, the root 1 of the tree $T_1$ is a leaf of the tree T.

A top point which is included in the directly partial tree of the tree T of which root is a top point v is called a descendant of the top point v and the root of the directly partial tree is called a child of the top point v. The point v is a parent of the child. In FIG. 19, Descendants of the point 2 are the points 3~8, child of the point 2 are the points 3~5. A parent of the points 3~5 is the point 2.

A length a rout from the root to each point is called a level of the point and a maximum length among these routs is called as a depth of the tree T. In FIG. 19, Length of the rout from the root to the leaf 6 or 7 or 8 is maximum, the depth is 3.

In the table 1, a type of each point, parent, child, descendant and level of the tree T are shown in FIG. 19.

TABLE 1

| top point | type | parent | child | descendant | level |
|---|---|---|---|---|---|
| 0 | root | none | {1,2} | {1 ~ 8} | 0 |
| 1 | leaf | 0 | { } | { } | 1 |
| 2 | inner point | 0 | {3 ~ 5} | {3 ~ 8} | 1 |
| 3 | inner point | 2 | {6 ~ 8} | {6 ~ 8} | 2 |
| 4 | leaf | 0 | { } | { } | 2 |
| 5 | leaf | 0 | { } | { } | 2 |
| 6 | leaf | 0 | { } | { } | 3 |
| 7 | leaf | 0 | { } | { } | 3 |
| 8 | leaf | 0 | { } | { } | 3 |

(Network management based on OSI management)

In a network management system based on the Open System Interconection (OSI), an abstractly described management object is defined as some MO (Managed Object) and an information of the MO is exchanged between a manager system and an agent system by using CMIS (Common Management Information Service). See [ITU-T. Rec. X.711, Common Management Information Protocol for ITU-T Applications, Mar. 1991] and [Hisao Ohkane, TCP/IP and OSI network management~SNMP and CMIP~, Software Research Center, 1993]. Hereinafter, the management system is called a manager and the agent system is called an agent.

FIG. 1, shows a network management based on OSI management. In FIG. 1, The network management is by a network management system and a managed apparatus. The network management system comprises a management console 11 and a manager 12. The managed apparatus comprises an agent 13 and an MIB (Management Information Base) 14. In the MIB, a group of MO such as total number of packets to be transferred, total number of received packets and total number of received packets including error are stored. The network management is achieved by exchanging a management information on MO through a network 15 between the manager 12 and the agent 13, on the basis of using the CMIP (Common Management Information Protocol).

For example, when the manager 12 issued a management operation 16 that means "get" of a number of already received packets, the agent 13 sends a response 17 such as "88 packets" from content of the MIB 14.

(Managed object instance and name tree)

Regarding MO, a kind of MO having the same character is called MOC (Managed Object Class). Each instance belonging to a certain MOC is called an MOI (Managed Object Instance). For an example of an MOC, a printer MOC 18 is shown in FIG. 2(A) and a printer MOI 19 in the printer MOC 18 is shown in FIG. 2(B).

Regarding a naming tree, in FIG. 3, the logical naming tree comprises a plural number of MOI 20 shown by white circles. A group of MOI is managed by a tree construction and stored in the MIB. For an example of the naming tree, the naming tree 22 of a telecommunication carrier 21 indicated by [XXX].

(Scope and Filter)

In CMIS, there are some scope (scope parameter) and some filter (filter parameter) by which one management operation enables to operate a plural number of MOI for reducing the amount of telecommunication taking place between the manager and the agent. Generally, scope and filter are set by an operator and an application program.

Scope is a parameter for designating a range of MOI to be managed in the naming tree. When using scope, BOI (Base Object Instance) is designated, wherein BOI is a start point in the designation of the range. Table 2 shows four kinds of scope defined by CMIS, namely BaseObject scope, BaseToNthLevel scope (N is not a negative integer), NthLevelOnly scope (N is not a negative integer) and WholeSubtree scope. FIG. 4 shows some examples of scope. In FIG. 4, BOI is MOI 23 indicated by a black circle.

TABLE 2

| scope | definition |
|---|---|
| BaseObject | A range is only BOI. |
| BaseToNthLevel | A range is a group of all MOI from BOI to Nth level MOI. BOI itself is included. |
| NthLevelOnly | A range is a group of MOI just below Nth level from BOI. |

TABLE 2-continued

| scope | definition |
| --- | --- |
| WholeSubtree | A range is a group all MOI below BOI. BOI itself is included. |

Namely,
1. As shown in FIG. 4(A), an object of the management operation of BaseToNthLevel scope is only BOI 23.
2. As shown in FIG. 4(B), objects of the management operation of BaseObject scope are BOI 23 and a group of all MOI from BOI 23 to Nth level (in FIG. 4(B), N=2) MOI.
3. As shown in FIG. 4(C), objects of the management operation of NthLevelOnly scope are only a group of MOI just below Nth level (in FIG. 4(C), N=3) MOI from BOI 23.
4. As shown in FIG. 4(D), objects of the management operation of WholeSubtree scope are BOI 23 and a group of all MOI below from BOI 23.

Filter is a parameter for designating further an object of a management operation from the MOI group in the range designated by scope. Filter is a logical equation indicating a size of MOI, coincidence of MOI and existence of MOI itself. For an example of a filter using an attribute of Printer MOI 19 shown in FIG. 2, there is a filter that (connection interface=RS232C) and (a number of printed sheets before last one hour >50), wherein "and" is a logical product.
(Abstract of access control based on ITU-T recommendation X.711)

For an interconnection among telecommunication carriers, the network management based on OSI management is opened and security functions such as access control becomes very important. In ITU-T recommendation X.711, "initiators" MOC, "targets" MCC and "rule" MOC are described and a plan for deciding denial and permission of the access. See [ITU-T. Rec. X.711, System Management: Object and attributes for access control, Dec. 1995].

Namely,
1. The "initiators" MOC is an MOC which indicates an initiator (an origin of issue of a management operation).
2. The "targets" MOC is an MOC which indicates an MIB to be protected or to be opened against a certain authority. An object to be protected or an object to be opened is called as a target. The target is designated by scope and filter.
3. The "rule" MOC is an MOC which indicates five rules for deciding denial and permission of the access from the "initiators" MOC and "targets" MCC.
4. As shown in FIG. 5, there are five rules of "rule" MOC, including a global denial rule, which denies access of the management operation to all objects, an item denial rule, which denies access of the management operation to some objects, a global permission rule, which permits an access of the management operation to all objects, an item permission rule, which permits access of the management operation to some objects and default rule, which is applied when it is impossible to decide between denial and permission by using the aforementioned four rules.
5. The decision of denial and permission is done according to a process shown in FIG. 5. In step S1, it is judged whether a global denial rule to be applicable exists or not. If the rule exists, all access is denied. If the rule does not exist, in next step S2, it is judged whether an item denial rule to be applicable exists or not. If the rule exists, access according to an access unit is denied. The access unit will be described later. If the rule does not exist, in step S3, it is judged whether a global permission rule to be applicable exists or not. If the rule exists, all access is permitted. If the rule does not exist, in next step S4, it is judged whether an item permission rule to be applicable exists or not. If the rule exists, access according to an access unit is permitted. If the rule does not exist, in step S5, an access permission or an access denial is decided by the default rule. The default rule, generally, is set so as to deny the access.

As access unit, there are a management operation (a rough access unit), an MOI being an object in a management operation (a moderate access unit) and an attribution of an MOI being an object in a management operation (a fine access unit). In the case of any access unit, an algorithm is necessary to decide between denial and permission, wherein the algorithm decides an intersection between an object of management operation and the protect object, or decides an object of management operation included within the open object.

However, such algorithm is not prescribed by an ITU-T recommendation X.711 at all.

Prior art.
(access control by using a management operation as the access unit)

There is known access control by using a management operation as the access unit reported by [Ohno, Yoda, Fujii ; Access Control Method in Telecommunication Network, CS94(39):19–24, Jun. 1994].

This prior art will be described referring to FIG. 6 and table 3. The naming tree T shown in FIG. 6 is comprises MOI indicated by A~N. Corresponding to the naming tree T, as shown in table 3, "initiators" MOC, "targets" MOC and "rule" MOC are defined. $MOI_A$, $MOI_B$, $MOI_C$ ... $MOI_N$ are used, in the case of designating each MOI.

TABLE 3

| MOC | MOI |
| --- | --- |
| initiators | X |
| initiators | Y |
| targets | $MOI_C$, $MOI_F$, $MOIG_G$, $MOI_J$ : targets 1 |
| targets | $MOI_D$, $MOI_F$, $MOI_G$ : targets 2 |
| rule | X can not access targets 1. (item denial rule : rule 1) |
| rule | Y can access targets 2. (item permission rule : rule 2) |
| rule | All management operations are denied. (default nile : nile 3) | table 3, the initiators X and the initiators Y are defined as MOI belonging to the "initiators" MOC. The initiators X is MOI indicating the origin X of issue of the management operation and the initiators Y is MOI indicating the origin Y of issue of the management operation. Further, the targets 1 and the targets 2 are defined as MOI belonging to "targets" MOC. The targets 1 is MOI of which protect object and open object are $MOI_C$, $MOI_F$, $MOI_G$ and $MOI_J$. The targets 2 is MOI of which protect object and open object are $MOI_D$, $MOI_F$ and $MOI_G$. The rule 1, the rule 2 and the rule 3 are defined as MOI belonging to "rule" MOC. The rule 1 is an item denial rule which denies any management operation from the origin X of issue, the rule 2 is an item permission rule which permits all management operations from the origin Y of issue and the rule 3 is a default rule which denies any management operation from all origin of issue.
(Decision of access denial in FIG. 6 and table 3: process of item denial rule)

For example, if a management operation having "WholeSubtree scope" of which BOI is $MOI_J$ from initiator X the item denial rule 1 is applied according table 3. At this time, as shown in FIG. 7, because $MOI_J$ in the management operation 24 is included within protect object 25, the management operation is denied.

Therefore, in the case of using the management operation as an access unit, if there is an intersection between a part of the object of the management operation and the protect object, the management operation is denied.

(Decision of access permission in FIG. 6 and table 3: process of item permission rule)

For example, if a management operation having "2ndLevelOnly scope" of which BOI is $MOI_A$ from initiator Y, the item permission rule 2 is applied according to table 3. At this time, as shown in FIG. 8, because $MOI_E$ in the management operation 26 is not included within open object 27, the management operation is not permitted.

Therefore, in the case of using the management operation as an access unit, if all the object included within open object, the management operation is not allowed.

As mentioned-above, in the prior art access control using the management operation as an access unit, if there is an intersection between an object of the management operation and the protect object, MOI access is denied even if the access should not have been denied.

Further, in the prior art access control using the management operation as an access unit, if there is an intersection between object of the management operation and the protect object, MOI access is denied even if the access is permitted.

These problems do not occur in an access control using the MOI as an access unit.

Accordingly, an object of the present invention is to provide a new access control using the MOI as an access unit.

Another object of the present invention is to provide a method for exchanging the identification name, a method for scope enumeration, a method for target enumeration and a method for detecting an intersection.

SUMMARY OF THE INVENTION

In the present invention, a pre-process is provided for reducing the time required for the denial and permission of access as compared to the prior art. In this pre-process, a corresponding table, which indicates a relationship between scope and a set of MOI included in the scope. Then, at every issue of the management operation, an intersection between the management operation and the protect object is decided by referring to the table. Further, at every issue of the management operation, a management operation included to the open object is obtained by referring to the table, then access denial and access permission are rapidly decided.

Namely, in the present invention, an identification name of MOI on the naming tree is exchanged to an index. The present invention includes a method for converting a name of MOI (Managed Object Instance) in a name tree to an index, wherein "n" denotes a number of MOI in the name tree, "[x]" denotes an integer rounded up from a value x and "XOR" denotes an exclusive OR, said method comprising:

a step for dividing a bit sequence to m blocks Bi ($1 \leq i \leq m$), wherein a number of each block is N which is given as a $[\log_2 n]$, a step for calculating an exclusive OR of a j-th bit $b_{ij}$ ($1 \leq j \leq N$) of each block $B_j$ as $C_j = b_{1j}$ XOR $b_2$, XOR $b_{j3}$ ... XOR $b_{mj}$, a step for making an N bit sequence $C_1 C_2 C_3 \ldots C_N$ as an index of an identification name by putting said calculated value $C_j$ from $C_1$ to $C_N$, wherein a value "0" is applied to an m-th block $B_m$ if an insufficiency of a bit occurs in the m-th block $B_m$.

The present invention includes a method for enumeration of some scope wherein, regarding each scope all of which can be designated in a management operation, an arrangement "scope[ ]" of which size is n and which represents an MOI included in the scope is obtained as, scope[i]=1 if an $MOI_i$ is included in the scope,
scope[i]=0 if an $MOI_i$ is not included in the scope.

The present invention includes a method for enumeration of some scope wherein, when new $MOIm_a$ is added to a name tree, the $MOIm_a$ is added to a BaseTojthLevel scope ($i \leq j$) of which BOI (Base Object Instance) is an $MOI_i$ ($1 \leq i \leq p$), a WholeSubtree scope and an ithLevelOnly scope, wherein MOI on a route from a $MOIm_1$ upper than $MOIm_a$ to a root $MOIm_p$ in the $MOIm_a$ to be added is put in order from $MOIm_1$ as $MOIm_1, MOIm_2, \ldots MOIm_p$.

The present invention includes a method for enumeration of some scope wherein, when an $MOIm_d$ is deleted from a name tree, the $MOIm_d$ is deleted from a BaseTojthLevel scope ($i \leq j$) of which BOI (Base Object Instance) is an $MOI_i$ ($1 \leq i \leq p$), a WholeSubtree scope and an ithLevelOnly scope, wherein MOI on a route from a $MOIm_1$ upper than $MOIm_d$ to a root $MOIm_p$ in the $MOIm_d$ to be deleted is put in order from $MOIm_1$ as $MOIm_1, MOIm_2, \ldots MOIm_p$.

The present invention includes a method for enumeration of a target wherein, regarding each targets MOI which is a protect target to be protected from an authority or an open target to be opened to an authority, an arrangement "targets[ ]" of which size is n and which represents the target MOI is obtained as, targets[i]=1 if an $MOI_i$ is protected or opened,
targets[i]=0 if an $MOI_i$ is not protected and not opened.

The present invention is a method for making a table wherein, regarding to each scope all of which can be designated in a management operation, a table corresponding to an MOI included in the scope is made.

The present invention includes a method for detecting an intersection wherein, an intersection between a management object and a protect object is obtained by calculating in each bit a logical product (logical and) between the "scope[ ]" obtained by any of above-mentioned methods and a denial of the "targets[ ]" obtained by above-mentioned method.

The present invention includes a method for detecting an intersection wherein, an intersection between a management object and a protect object is obtained by calculating in each bit a logical product (and) between the "scope[ ]" obtained by any of above-mentioned methods and the "targets[ ]" obtained by above-mentioned method.

The present invention includes an access control method by using MOI as an access unit comprises; a step for calculating in each bit a logical product (logical and) between a denial of each "targets[ ]" in an item denial rule obtained by above-mentioned method and the "scope[ ]" obtained by any of above-mentioned methods, and a step for allowing only an MOI of which scope[i]=1 based on said calculation.

The present invention includes an access control method by using MOI as an access unit comprises; a step for calculating in each bit a logical product (logical and) between each "targets[ ]" in an item permission rule obtained by above-mentioned method and the "scope[ ]" obtained by any of above-mentioned methods, and
a step for allowing only an MOI of which scope[i]=1 based on said calculation.

These access controls are adaptive to a dynamic change of the naming tree based on the management operation such as M-CREATE and M-GET. Namely, based on the management operation such as M-CREATE and M-GET, a new MOI is generated or added to the naming tree, or, an old MOI is deleted from the naming tree. Therefore, it is necessary to update the corresponding table. In the present invention, it is possible to easily revise a part to be changed, so that it is unnecessary to change entire the table.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood accompanying drawings which are given by way of illustration only, and thus are not limitative of the present invention, and wherein:

FIG. 1 shows an abstract of a network management based on OSI management.

DETAILED DESCRIPTION OF PREFERRED EMBODIMENTS

Figure 2A:
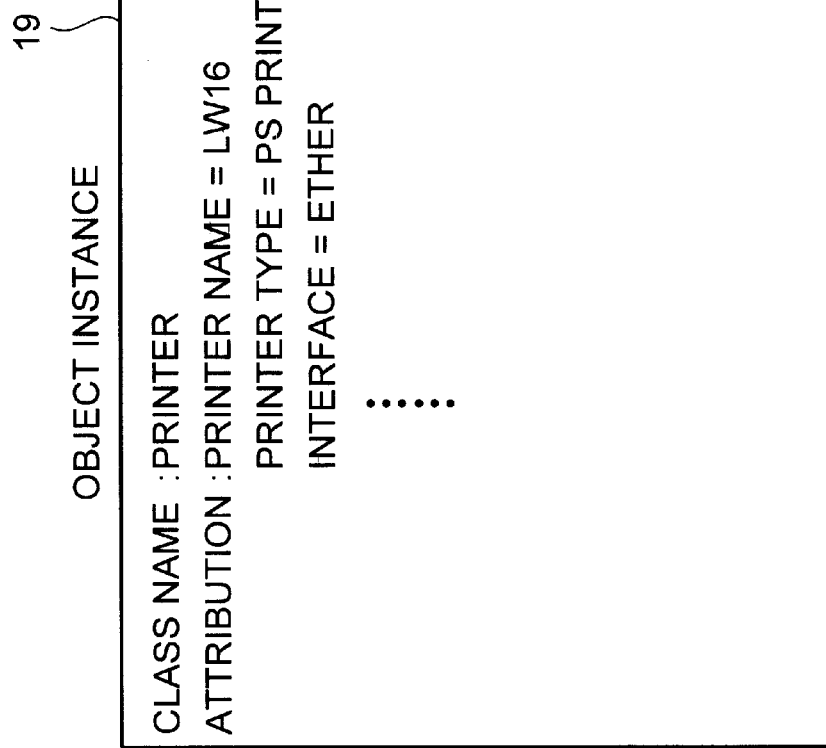
FIGS. 2(A) and 2(B) show examples of MOC and MOI.
Figure 2B:
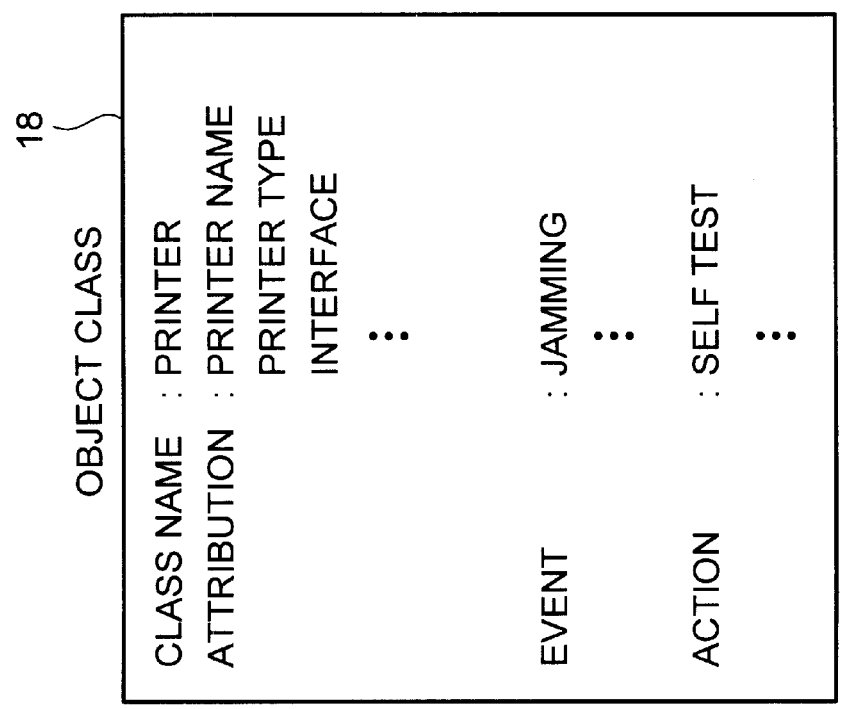
Figure 3:
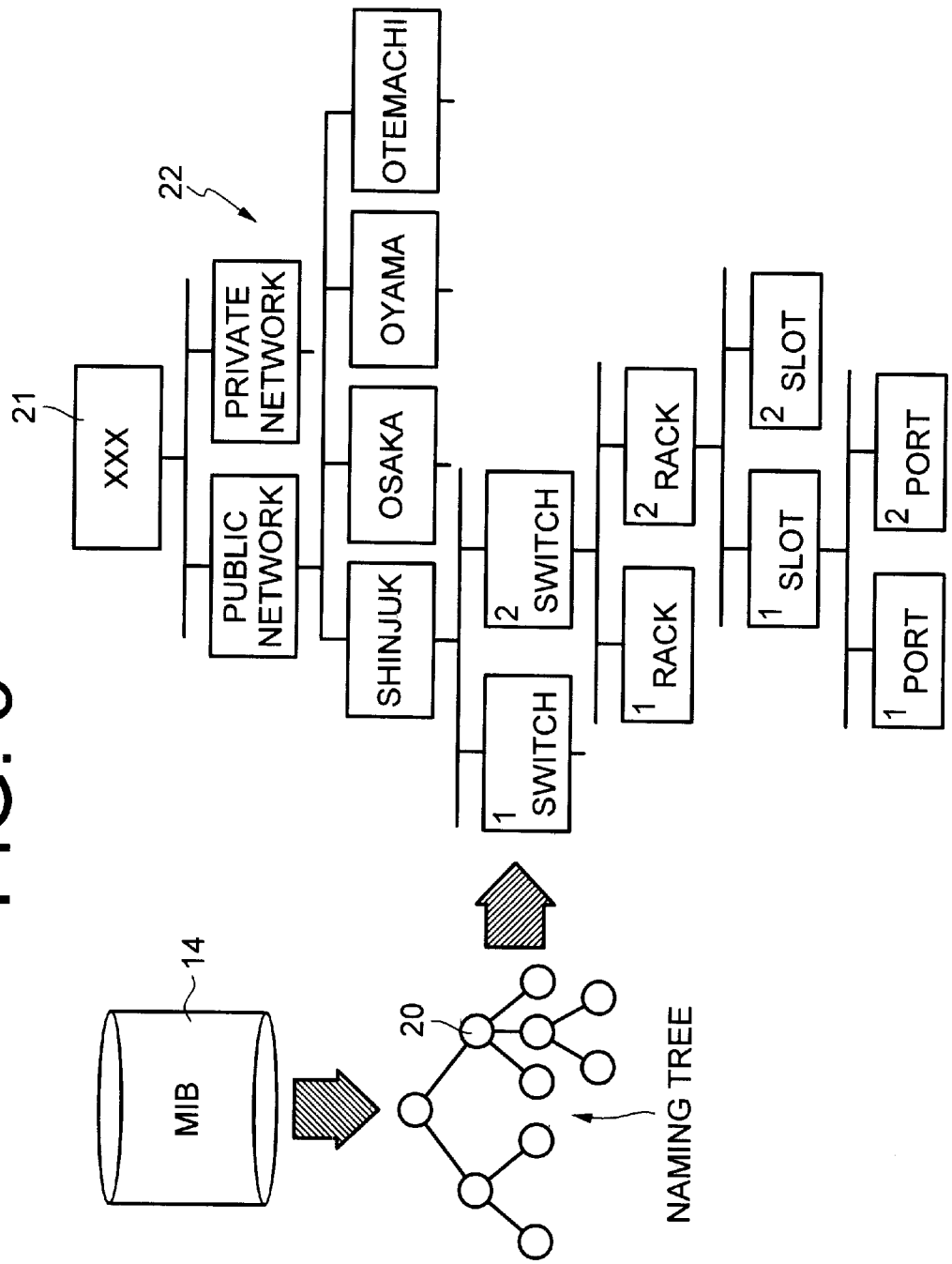
FIG. 3 shows a naming tree.
Figure 4B:
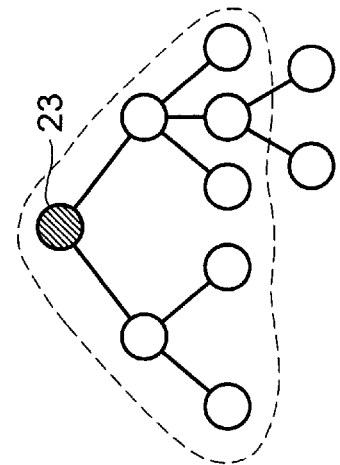
FIG. 4(B) shows scope.
Figure 4D:
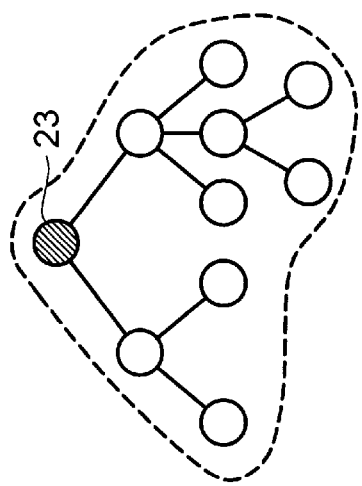
FIG. 4(D) shows scope.
Figure 4A:
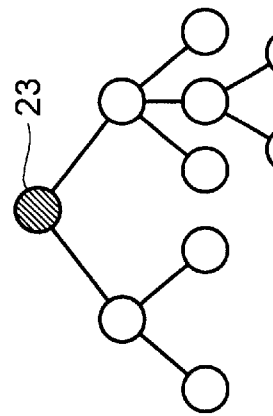
FIG. 4(A) shows scope.
Figure 4C:
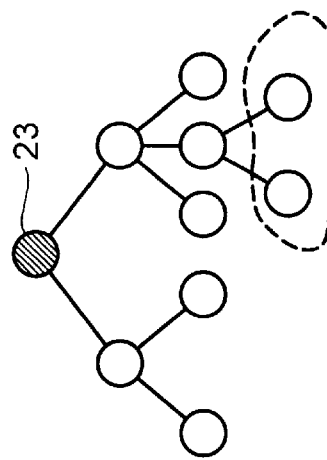
FIG. 4(C) shows scope.
Figure 5:
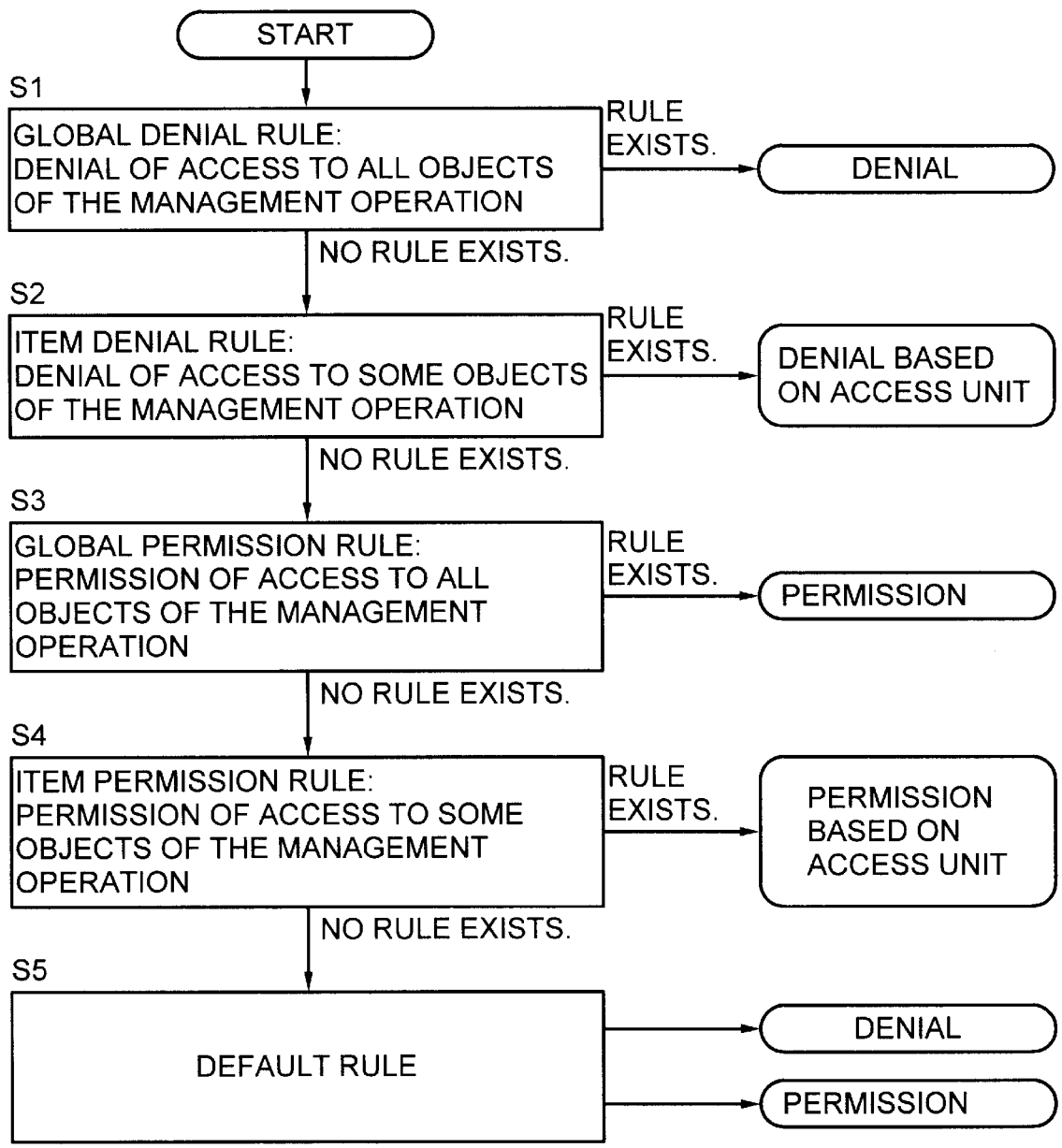
FIG. 5 shows a process of decision of denial and permission based on ITU-T recommendation X.711.
Figure 6:
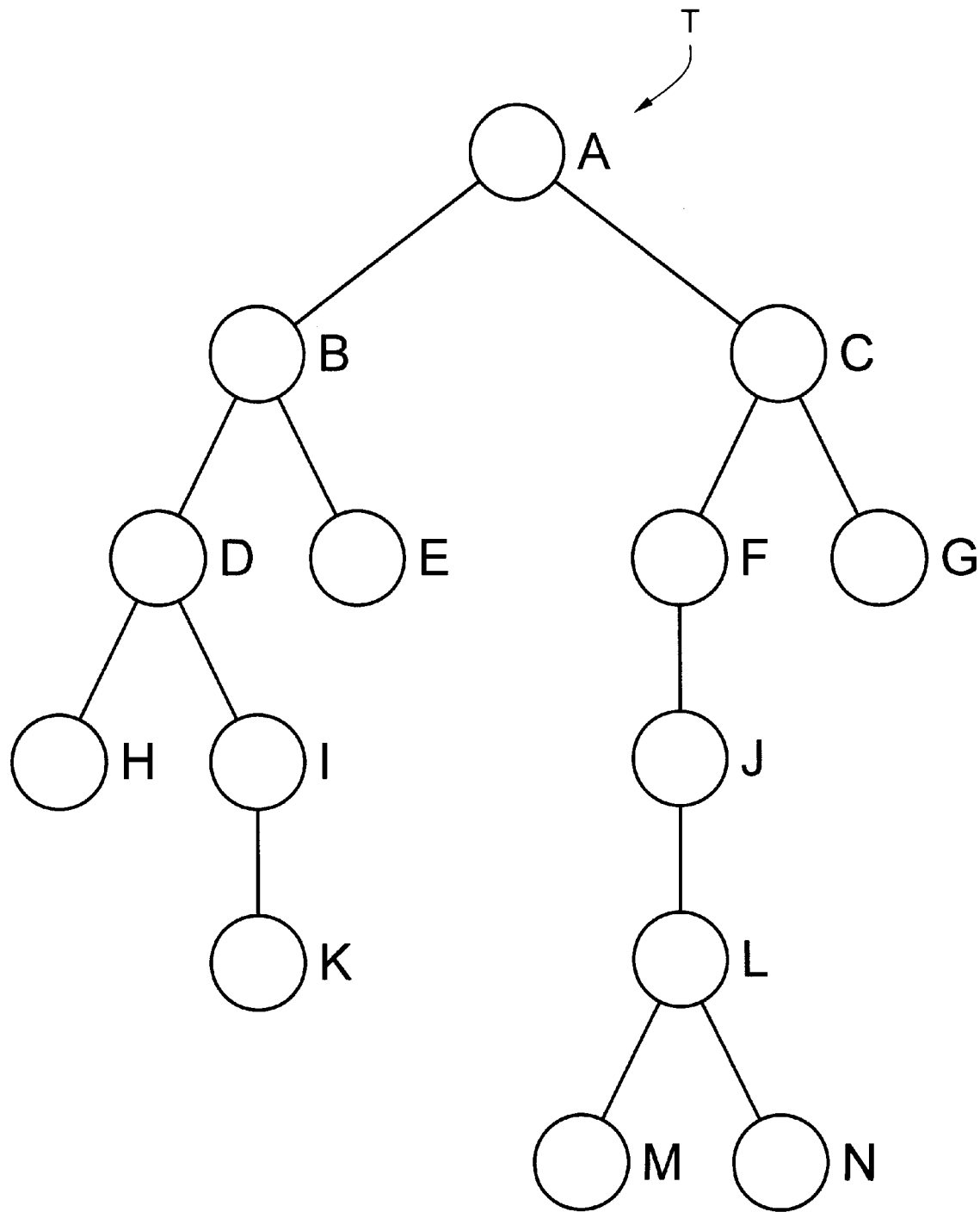
FIG. 6 shows a naming tree.

An embodiment of the present invention will be explained referring to the drawings.

Figure 9:
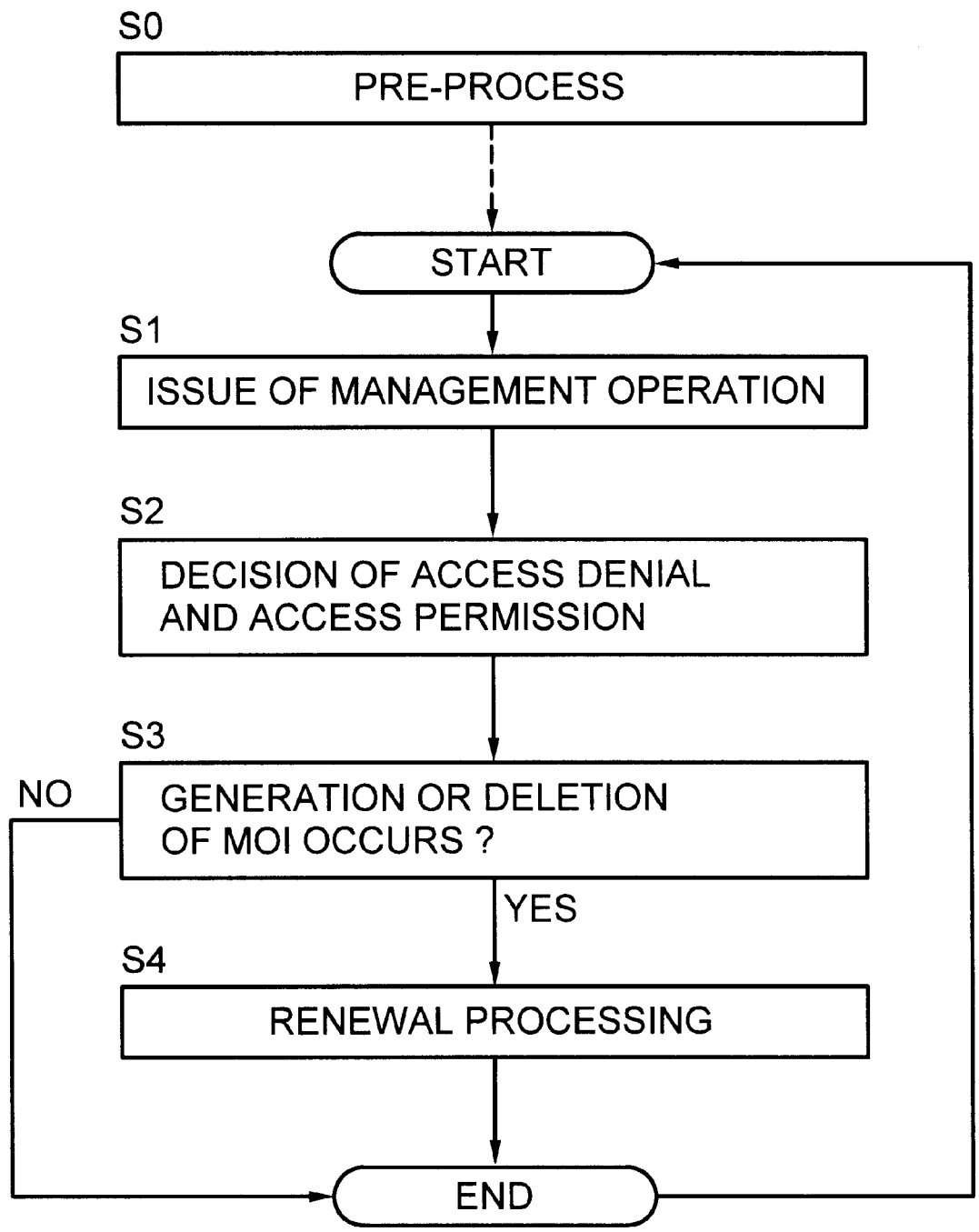
FIG. 9 is a flow chart showing a whole of access control based on the present invention.

As shown in FIG. 9, in step S0, a pre-process is carried out to the naming tree which is an object of access control for achieving a rapid access denial and permission. In the pre-processing, at every scope all of which is designated by the management operation, all MOI included within the scope. One time of the pre-processing is sufficient.

After pre-processing, in step S1, a management operation is issued. Then, in step S2, access denial and access permission are decided by using a corresponding table which was made in a step for table making in the pre-processing.

In a step S3, it is judged whether generation or deletion of MOI. If MOI is changed, an updating of the corresponding table is carried out before the next decision of access denial or access permission of the management operation.

(Abstract of pre-processing)

Figure 10:
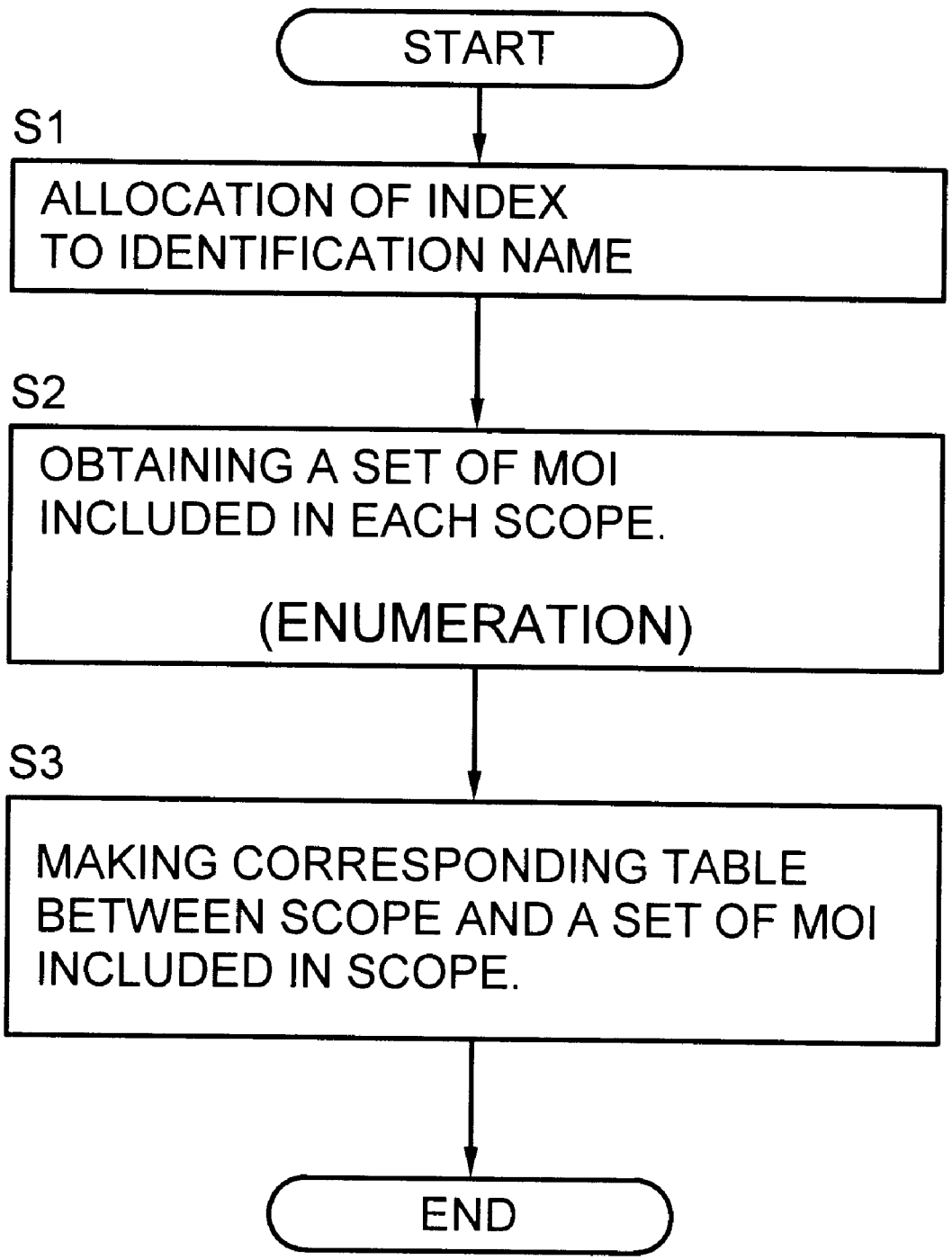
FIG. 10 is a flow chart showing the pre-process.

As shown in FIG. 10, in pre-processing, an identification name of MOI is converted in step S1. After step S1, at every scope all of which is designated by the management operation, all MOI included within the scope in step S2. Then, in step S3, the corresponding table which corresponds to a relationship between scope and a set of MOI included within the scope.

(Detailed description 1 of pre-processing: conversion step of identification name)

The identification name of MOI is encoded according to BER (Basic Encoding Rules) of ASN.1 (Abstract Syntax Notation.1) etc. See [ITU-T. Rec. X.690, ASN.1 encoding rules: Specification of BER, Canonical ENcoding rules (CER), and Distinguished encoding rules (DER), 1994].

Figure 11:
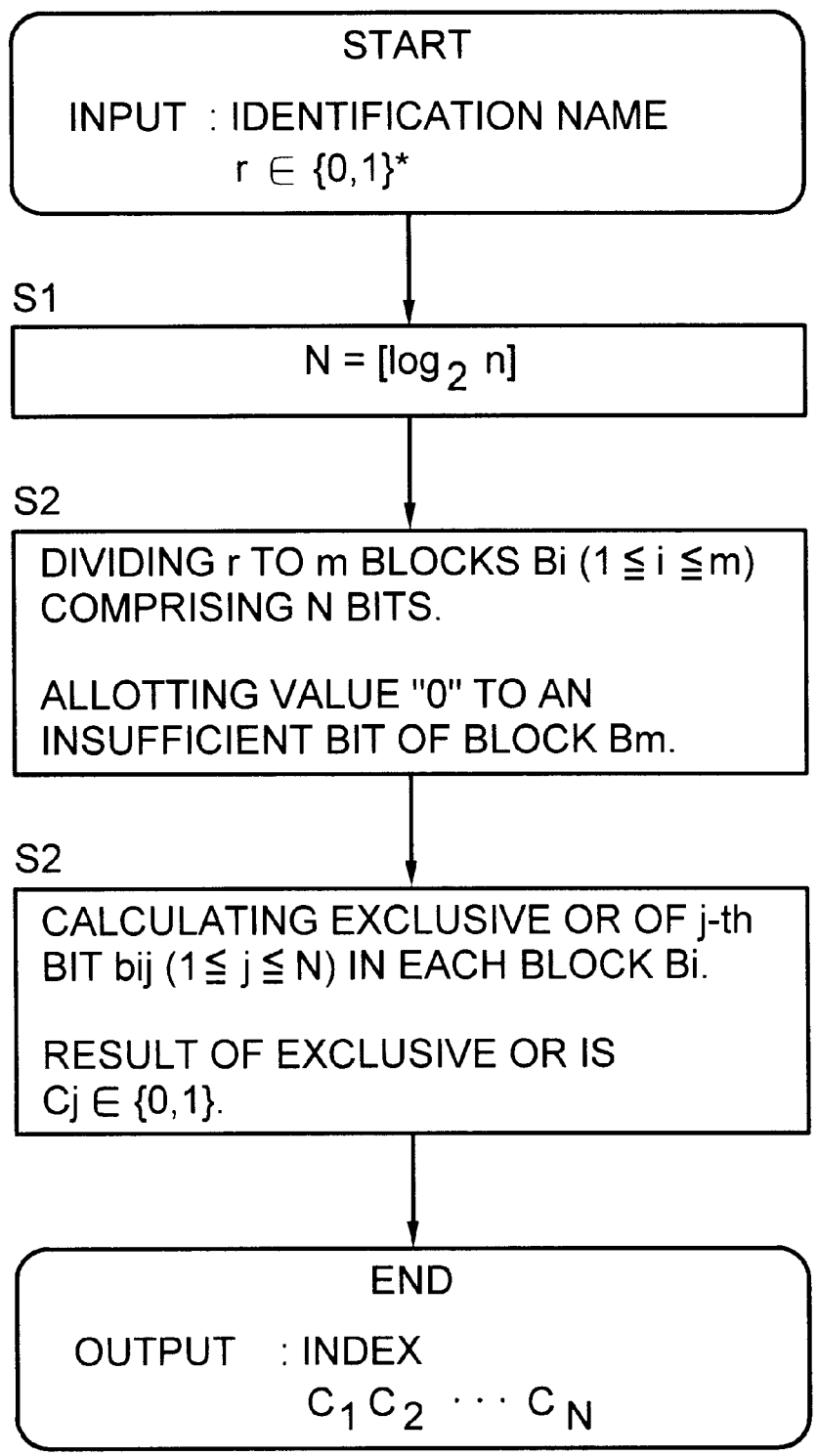
FIG. 11 shows a step for conversion of the identification name.

The identification name is converted, as shown FIG. 11, by allotting an index to the encoded identification name of MOI.

In FIG. 11, "r" denotes the identification name comprising "1" and "0" of input MOI, "|r|" denotes a bit length of the identification name "r". "n" denotes a number of MOI in the naming tree, "N" denotes a number of bits of the index allotted to the identification name "r". "[x]" denotes an integer rounded up from a value x. "XOR" denotes some exclusive OR as shown in an equation 3.

$$x, y \in \{0,1\}$$
$$x \text{ XOR } y = 0 \text{ (when } x=y)$$
$$x \text{ XOR } y = 1 \text{ (when } x \neq y) \quad \text{(equation 3)}$$

In the steps shown in FIG. 11

(1) A conversion is stared by an input of MOI having the identification name r.

(2) In step S1, a value N is calculated by $N=[\log_2 n]$ from the number n of MOI in the naming tree. Namely, it is possible to indicate all of MOI by an index which is N bits sequence.

(3) In step S2, the identification name r is divided to m blocks $B_i$ ($1 \leq i \leq m$), wherein a number of each block is N bits. A value "0" is applied to an m-th block $B_m$ if an insufficiency of a bit occurs in the m-th block $B_m$.

(4) In step S3, an exclusive OR of a j-th bit $b_{ij}$ ($1 \leq j \leq N$) of each block $B_i$ is calculated as $C_j = b_{1j}$ XOR $b_{2j}$ XOR $b_{3j}$ ... XOR $b_{mj}$, (5) The identification name r is converted to an N bits sequence $C_1 C_2 C_3 \ldots C_N$ by using $C_j$ and the N bits sequence $C_1 C_2 C_3 \ldots C_N$ is outputted as an index. Namely, the index is made by putting said calculated value $C_j$ from $C_1$ to $C_N$ in order.

(6) The index allots 0~n-1 in decimal to n MOI on the naming tree. There is not same index among MDI because of using XOR. While the length of the identification name r is not constant among MDI on the naming tree, it is possible to use an index having a constant length because of the conversion of $C_1 C_2 C_3 \ldots C_N$. Further, it is possible to achieve a high speed access the length of the index $C_1 C_2 C_3 \ldots C_N$ shorter than the length of the identification name r.

An example of the conversion of the identification name, wherein input identification name r is 10001000 00001110 10110001 00010000 11000100 00011000 and a number n is 100.

(1) In step S1, N=[$\log_2 100$]=[6.6438 ... ]=7.
(2) In the step S2, |r|=48, m=7 from (48/7)+1, then the identification name r is divided to 7 blocks Bi ($1 \leq i \leq 7$), wherein a number of each block is 7 bits. A value "0" is applied to the 7-th bit of final block Br because N×m−|r|=49−48=1. Namely, $B_1$=1000100, $B_2$=0000011, $B_3$=1010110, $B_4$=0010001, $B_5$=0000110, $B_6$=0010000, $B_7$=0110000

(3) For example, in the 1st bit $b_{i1}$ of each block $B_i$ ($1 \leq i \leq N$), the 1st bit $C_1$=1 XOR 0 XOR 1 XOR 0 XOR 0 XOR 0 XOR=0 because of $b_{11}$=1, $b_{21}$=0, $b_{31}$=1, $b_{41}$=0, $b_{51}$=0, $b_{61}$=0, $b_{71}$=0.
(4) In the same way, $C_2$=1, $C_3$=0, $C_4$=0, $C_5$=1, $C_6$=1, $C_7$=0.
(5) Then the identification name r is converted to "0100110" based of the bit sequence $C_1C_2C_3C_4C_5C_6C_7$=0100110.

(Detailed description 2 of pre-processing: enumeration step)

Figure 12:
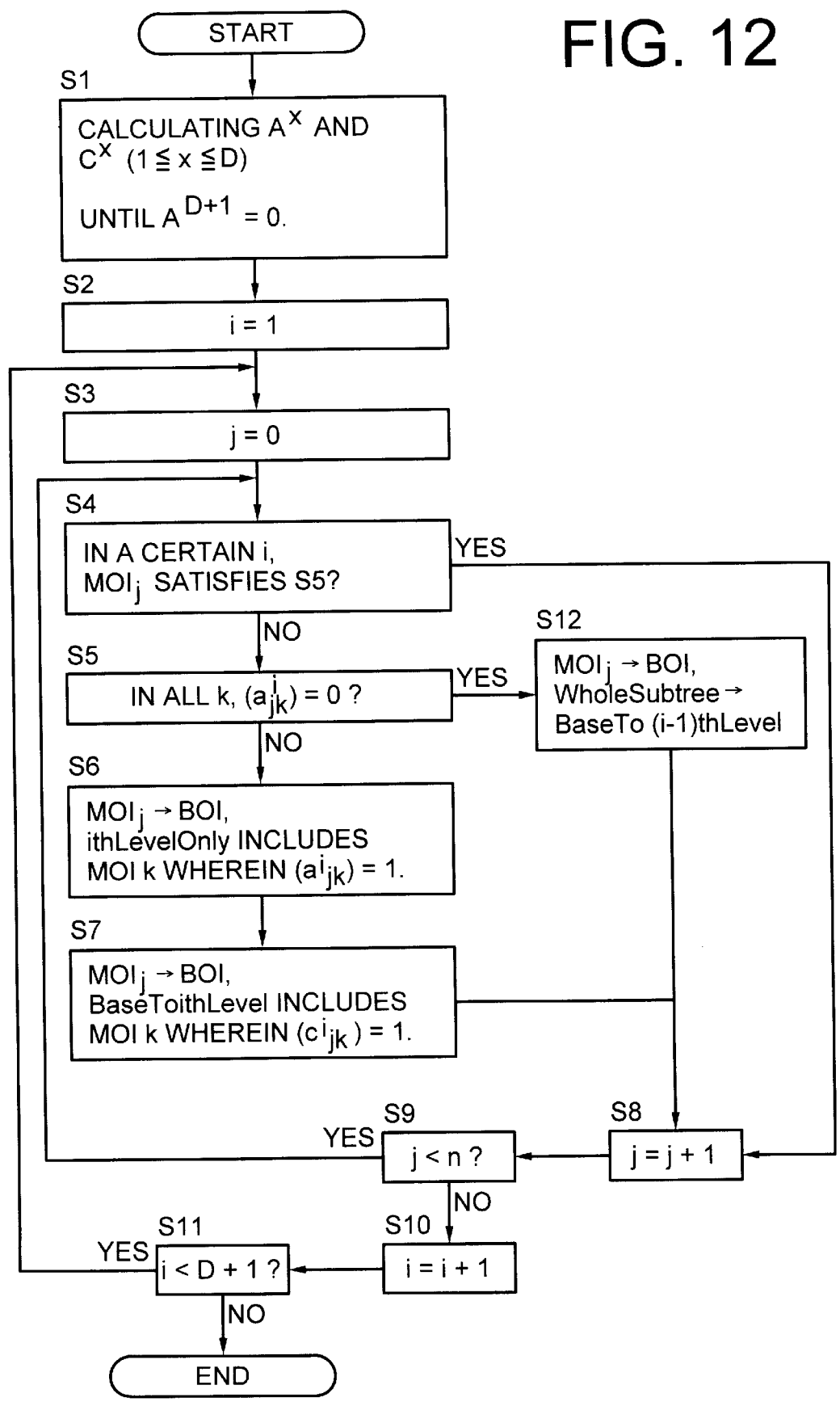
FIG. 12 shows a step of enumeration.

In the enumeration step, as shown in FIG. 12, MOI included within scope is obtained at every scope of all scope designated by the management operation. Therefor, as defined by equations 4–7, a matrix A having a size of n×n and a matrix C having a size of n×n. The matrix A is a connection matrix which denotes the naming tree. In step 12, shown in FIG. 12, while the BaseTo(i−1)thLevel scope becomes to a BaseTo0thLevel scope, the BaseTo0thLevel scope is treated as a BaseObject scope.

($a_{ij}$)=1,=when $MOI_i$ with index i being a parent of $MOI_j$ with index j on the naming tree T, ($a_{ij}$)=0,=when $MOI_i$ with index i not being a parent of $MOI_j$ with index j on the naming tree T, (equation 4)

wherein ($a_{ij}$) is an element on i-th line and j-th row of the matrix A.

$A^0$=E (unit matrix) (equation 5)

$A^i$=A*$A^{(i-1)}$ ($i \leq 1$) (equation 6)

$C^i$=$A^0$+$A^1$+$A^2$+ ... +$A^i$ (equation 7)

In FIG. 12,
(1) In step S1, $A^x$ and $C^x$ ($1 \leq x \leq D$) are calculated until $A^{n+1}$=0, wherein D is depth of the naming tree T.
(2) In step S2, i and $A^i$ are initialized as i=1 and $A^i$=A*$A^{(i-i)}$=A.
(3) In step S3, when MOI having index j is indicated as $MOI_j$, j is initialized as j=0.
(4) In step S4, it is judged whether $MOI_j$ satisfies a condition indicated in next step S5. If not satisfied, the step S5 is done. If satisfied, a step S8 is done.
(5) In the step S5, when ($a^i_{jk}$) indicates an element in j-th line of $A^i$ or an element of which line is $MOI_j$ of a certain matrix $A^i$, it is judged whether ($a^i_{jk}$) is 0 about all k. If not satisfied, the step S6 is done. If satisfied, a step S12 is done.
(6) In the step S6, it is judged that ithLevelOnly scope of which BOI is $MOI_j$ includes $MOI_k$, wherein ($a^i_{jk}$)=1. Then a step S7 is done.
(7) In the step S7, when ($C^i_{jk}$) indicates an element in j-th line of $C^i$ or an element of which line is $MOI_j$ of a certain matrix $C^i$, it is judged that BaseToithLevel scope of which BOI is $MOI_j$ includes $MOI_k$, wherein ($c^i_{jk}$)=1. Then a step S8 is done.
(8) In the step S12, WholeSubtree scope of which BOI is $MOI_j$ is treated as BaseTo(i−1)thLevel scope. Then a step S8 is done.
(9) In the step S8, j is increased by 1. Then a step S9 is done.
(10) In the step S9, it is judged whether j is smaller than n. If true, the step S4 is done. If false, a step S10 is done.
(11) In the step S10, i is increased by 1, namely the matrix $A^i$ is changed into a matrix $A^{i+1}$ and the matrix $C^i$ is changed into a matrix
(12) In an step S11, it is judged whether i is smaller than D+1. If true, the step S3 is done. If false, the enumeration is finished.

(example of enumeration)

Figure 13:
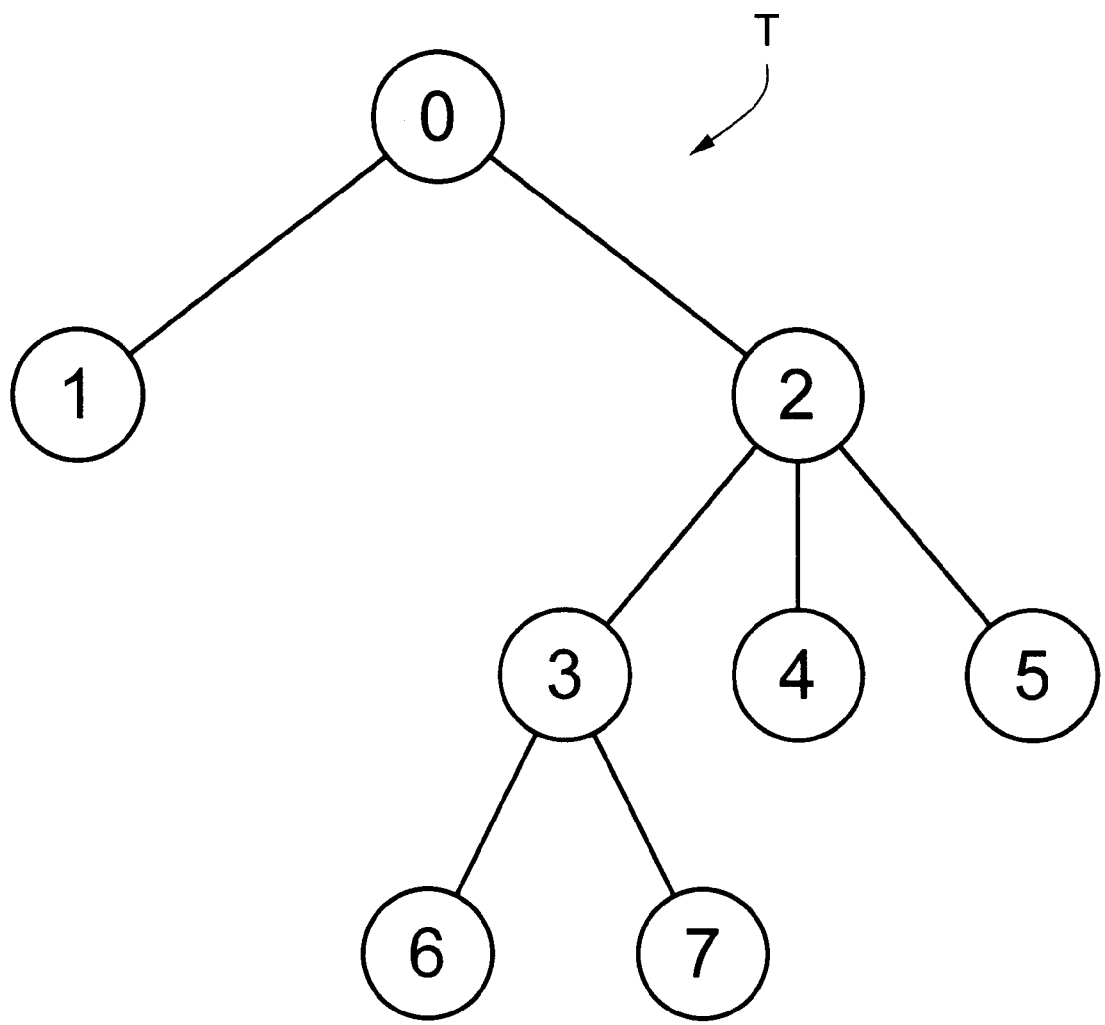
FIG. 13 shows a naming tree for enumeration.

An example of the enumeration step is explained on the naming tree T shown in FIG. 13. The connection matrix A of the tree T is shown in the equation 8. The matrix is started from 0-th line and 0-th row.

$$A = \begin{pmatrix} 01100000 \\ 00000000 \\ 00011100 \\ 00000011 \\ 00000000 \\ 00000000 \\ 00000000 \\ 00000000 \end{pmatrix} \quad \text{(equation 8)}$$

(1) In step S1 shown in FIG. 12, $A^2$, $A^3$, $A^4$, $C^2$ and $C^3$ are obtained as shown in equations 9~13 based equations 6 and 7.

$$A^2 = \begin{pmatrix} 00011100 \\ 00000000 \\ 00000011 \\ 00000000 \\ 00000000 \\ 00000000 \\ 00000000 \\ 00000000 \end{pmatrix} \quad \text{(equation 9)}$$

$$A^3 = \begin{pmatrix} 00000011 \\ 00000000 \\ 00000000 \\ 00000000 \\ 00000000 \\ 00000000 \\ 00000000 \\ 00000000 \end{pmatrix} \quad \text{(equation 10)}$$

$$A^4 = \begin{pmatrix} 00000000 \\ 00000000 \\ 00000000 \\ 00000000 \\ 00000000 \\ 00000000 \\ 00000000 \\ 00000000 \end{pmatrix} \quad \text{(equation 11)}$$

-continued $$C^2 = \begin{pmatrix} 01111100 \\ 00000000 \\ 00011111 \\ 00000011 \\ 00000000 \\ 00000000 \\ 00000000 \\ 00000000 \end{pmatrix} \quad \text{(equation 11)}$$

$$C^3 = \begin{pmatrix} 01111111 \\ 00000000 \\ 00011111 \\ 00000011 \\ 00000000 \\ 00000000 \\ 00000000 \\ 00000000 \end{pmatrix} \quad \text{(equation 12)}$$

(2) i is set as i=1 in the step S2 and j is set as j=0 in the step S3.

(3) In step S4, $MOI_j$ does not satisfy the condition indicated in the step S5. Then the step S5 is done.

(4) In step S5, $(a^i_{jk})$ is not 0 about all k. Then, the step S6 is done.

(5) In step S6, ith(1st)LevelOnly scope of which BOI is MOI (=$MOI_0$) includes $MOI_1$ and $MOI_2$, because of $(a^1_{01})=1$ and $(a^1_{02})=1$.

(6) In step S7, BaseToithLevel (=BaseTo1stLevel) scope of which BOI is $MOI_j$ (=$MOI_0$) includes $MOI_0$, $MOI_1$ and $MOI_2$, because of $(c^1_{00})=1$, $(C^1_{01})=1$ and $(C^1_{02})=1$.

(7) In step S8, j=j+1=0+1−1 and j=1<n=8. The step S4 is done because the judgement in step S9 is false.

(8) In step S4, $MOI_j$ does not satisfy the condition indicated in the step S5. Then step S5 is done.

(9) In the step S5, $(a^1_{1k})$ is 0 about all k. Then step S12 is done because the judgement in step S9 is false.

(10) In step S12, WholeSubtree scope of which BOI is $MOI_j$ (=$MOI_0$) is treated as BaseTo(i−1)thLevel (=BaseTo0thLevel=BaseObject) scope.

(11) By repeating the same process, at every scope, a set of MOI is included in each scope.

(step for making a corresponding table)

A table indicating a correspondence between scope and MOI included within scope is made by using the above-mentioned results. The table shows a part of the table corresponding to the naming tree T shown in FIG. 13. Namely, all of scope is indicated as a combination of a type of scope and MOI. Regarding each scope all of which can be designated in a management operation, an arrangement "scope[ ]" of which size is n and which represents an MOI included in the scope is obtained as, scope[i]=1 if an $MOI_i$ is included in the scope, scope[i]=0 if an $MOI_i$ is not included in the scope.

Then, the corresponding table is made by obtaining "scope[ ]".

TABLE 4

| BOI | type of scope | 0 1 2 3 4 5 6 7 |
|-----|---------------|------------------|
| 0 | BaseObject | 1 0 0 0 0 0 0 0 |
| 0 | BaseTo1stLevel | 1 1 1 0 0 0 0 0 |
| 0 | BaseTo2ndLevel | 1 1 1 1 1 1 0 0 |
| 0 | WholeSubtree | 1 1 1 1 1 1 1 1 |
| 0 | 1stLevelOnly | 0 1 1 0 0 0 0 0 |
| 0 | 2stLevelOnly | 0 0 0 1 1 1 0 0 |
| 0 | 3rdLevelOnly | 0 0 0 0 0 0 1 1 |
| 1 | BaseObject | 0 1 0 0 0 0 0 0 |
| 2 | BaseObject | 0 0 1 0 0 0 0 0 |
| 2 | BaseTo1stLevel | 0 0 1 1 1 1 0 0 |
| 2 | WholeSubtree | 0 0 1 1 1 1 0 0 |
| 2 | 1stLevelOnly | 0 0 0 1 1 1 0 0 |
| 2 | 2stLevelOnly | 0 0 0 0 0 0 1 1 |

Referring to an example shown in table 4 and FIG. 7 and FIG. 8, a process to decide an access denial and permission will be described.

(example of decision for an access denial)

Figure 7:
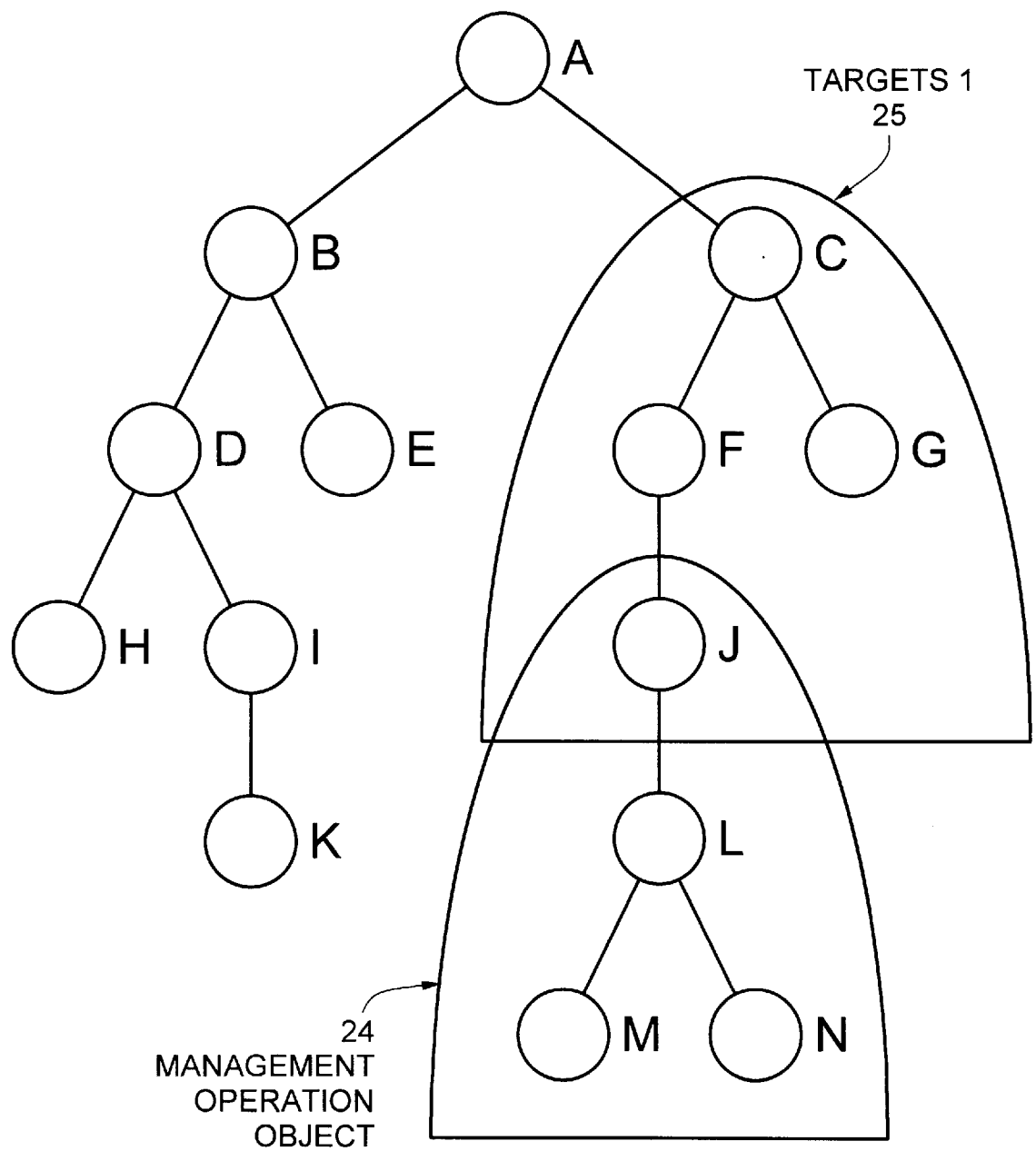
FIG. 7 shows a prior art.

In FIG. 7, objects of the management operation are J, L, M and N out of all MOI indicated by A~N on the naming tree T. Therefore, scope[i]=1 denotes that $MOI_i$ is included within scope and scope[i]=0 denotes that $MOI_i$ is not included within scope. The size of scope[ ] is n (A~N). Then scope [ ] becomes as shown below. Further, in the table 3, access to the targets 1 ($MOI_C$, $MOI_F$, $MOI_G$, $MOI_J$) by the initiator X is denied because of the item denial rule 1. Therefor, targets[i]=1 denotes that $MOI_i$ is protected and targets[i]=0 denotes that $MOI_i$ is not protected. Size of targets[ ] is n. Then targets[ ] becomes as shown below.

ABCDEFGHIJKLMN scope[ ]=00000000010111 targets[ ]=00100110010000 Wherein, scope[ ]=00000000010111(n=14) is quickly and easily obtained by previously making the corresponding table of the tree shown in FIG. 7 in the above-mentioned step, because the object of the management operation shown in FIG. 7 can be designated by WholeSubtree scope of which BOI is $MOI_J$.

Figure 14:
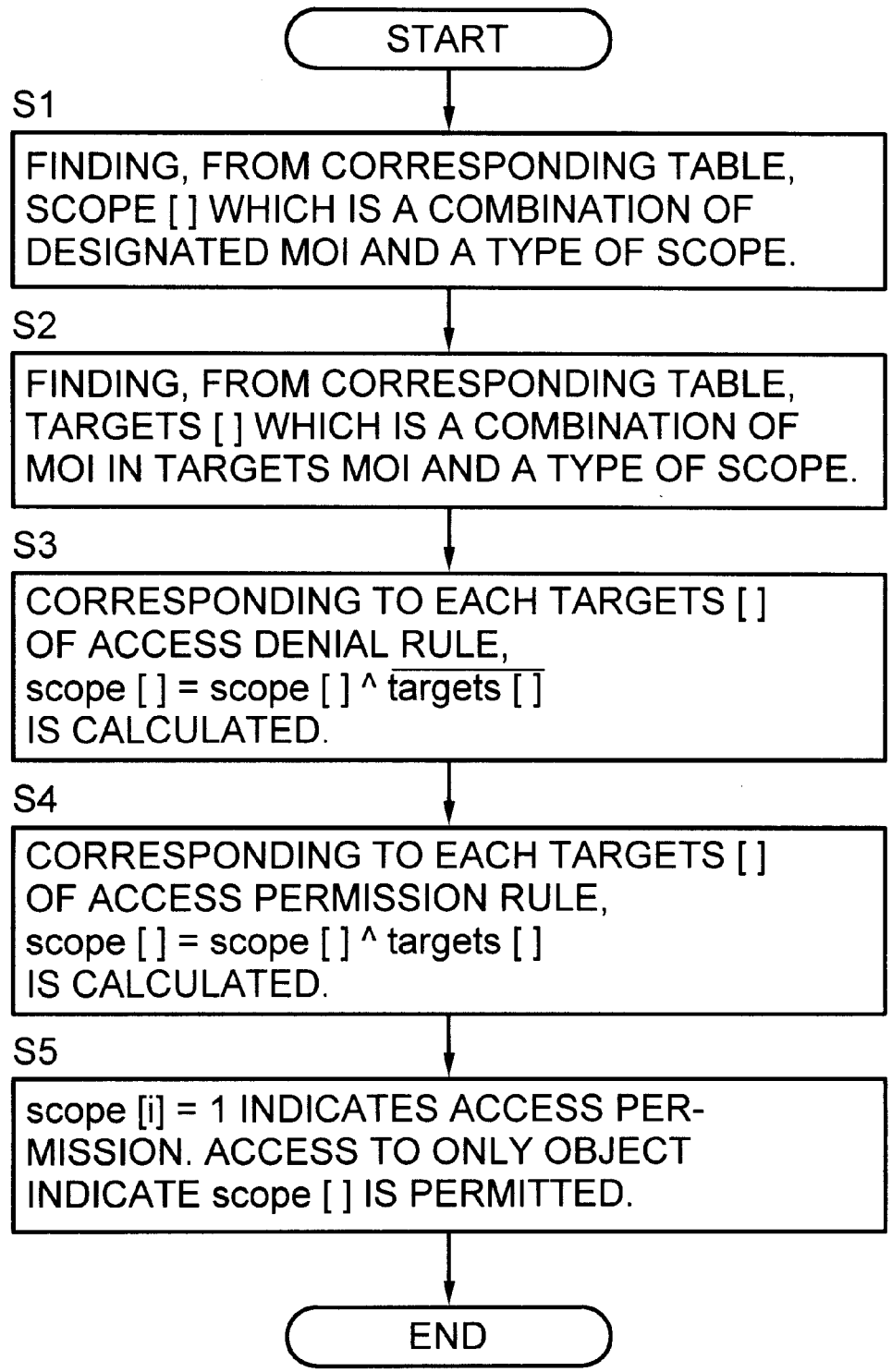
FIG. 14 is a flow chart showing access denial and access permission of access control based on the present invention.

By step S3 shown in FIG. 14, a denial of each bit element of "targets [ ]" is a bit sequence of 11011001101111. In each bit, a logical product (logical and) between the "scope[ ]" (=00000000010111) and a denial (=11011001101111) of the "targets[ ]" (=00100110010000 ) is calculated.

Scope[ ] then becomes.

ABCDEFGHIJKLMN scope[ ]=00000000000111

Namely, access to only $MOI_J$ is denied and access to $MOI_L MOI_M$ and $MOI_N$ are not denied.

(example of decision for an access permission)

Figure 8:
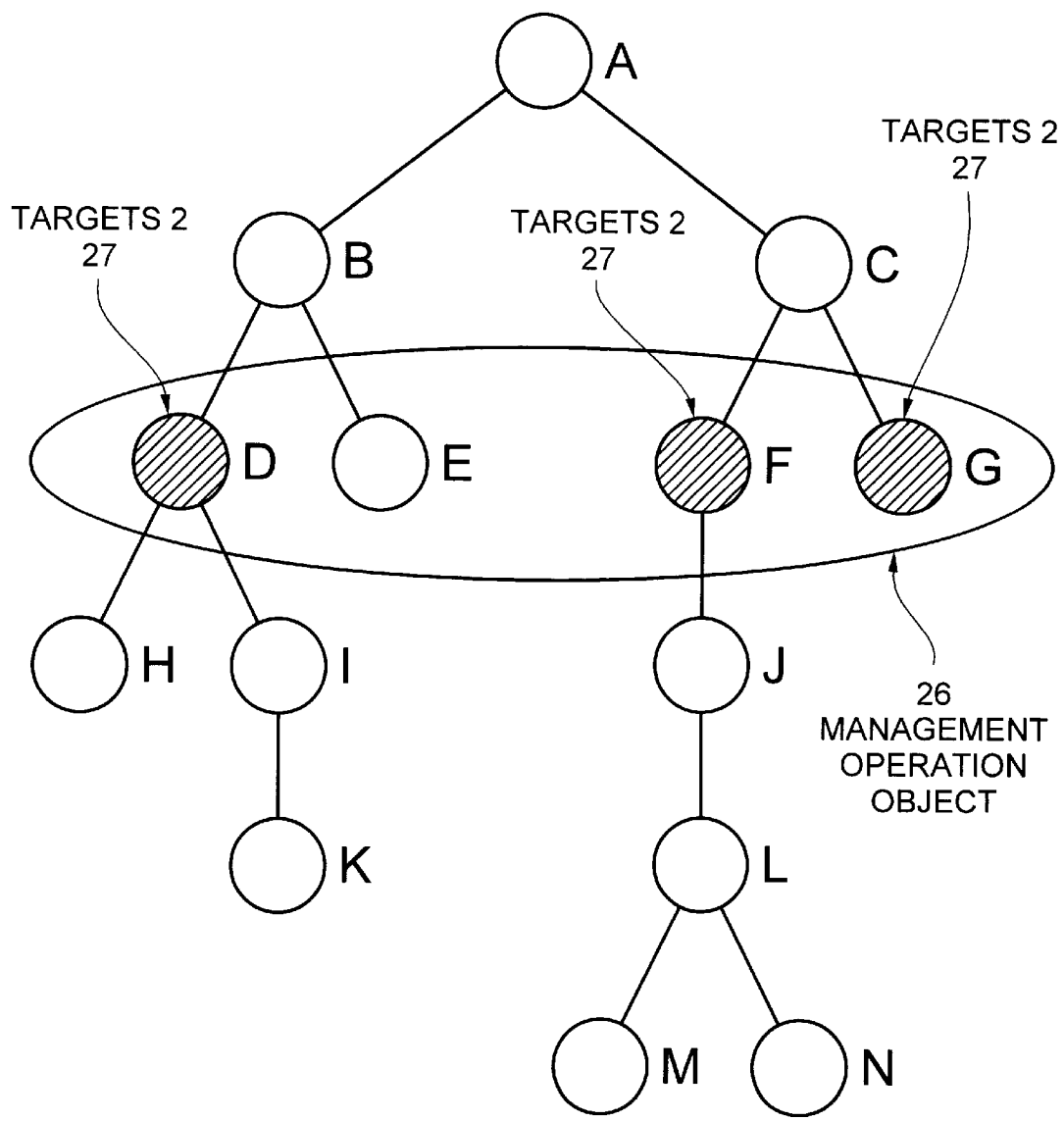
FIG. 8 shows a prior art.

In FIG. 8, objects of management operation are D, E, F and G out of all MOI indicated by A~N on the naming tree T. Therefore, scope[i]=1 denotes that $MOI_i$ is included within scope and scope[i]=0 denotes that $MOI_i$ is not included within scope. Size of scope[ ] is n (A~N). Then scope[ ] becomes as shown below. Further, in table 3, access to targets 2 ($MOI_D$, $MOI_F$, $MOI_G$, $MOI_J$) by the initiator Y is permitted because of item permission rule 2. Therefore, targets[i]=1 denotes that $MOI_i$ is opened and targets[i]=0 denotes that $MOI_i$ is not opened. Size of targets[ ] is n. Then targets[ ] becomes.

ABCDEFGHIJKLMN
scope[ ]=00011110000000
targets[ ]=00010110000000

Wherein, scope[ ]=00011110000000(n=14) is quickly and easily obtained by previously making the corresponding table of the tree shown in FIG. 8 in the above-mentioned step, because the object of the management operation shown in FIG. 8 can be designated by 2ndLevelOnly scope of which BOI is $MOI_A$.

By step S4 shown in FIG. 14, in each bit, a logical product (logical and) between "scope[ ]" (=00011110000000) and "targets[ ]" (=00010110000000) is calculated.

Scope[ ] then becomes.

ABCDEFGHIJKLMN
scope[ ]=00010110000000

Namely, access to $MOI_D$, $MOI_F$ and $MOI_G$ are permitted.
(updating of corresponding table)

A renewal of the corresponding table will be described.

As mentioned-above, the configuration of the naming tree may be changed when a new MOI is generated or added and when an old MOI is deleted. Therefore, it becomes necessary to update the table.
(generation of MOI)

Figure 15:
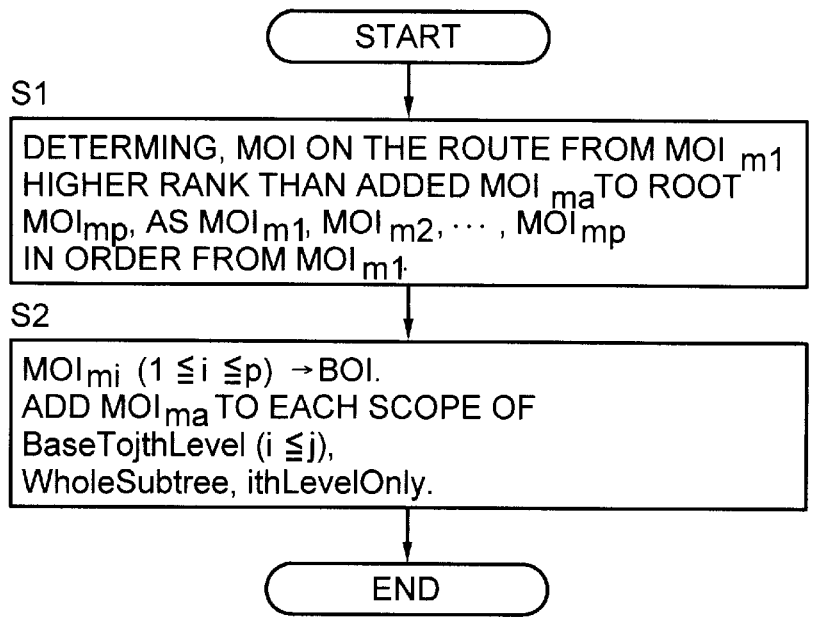
FIG. 15 is a flow chart for renewal of the corresponding table in the case of adding MOI.

FIG. 15 shows a step for updating the table when a new $MOIm_a$ is added to the naming tree.

(1) In step S1 in FIG. 15, all MOI on a route from a $MOIm_1$ upper than $MOIm_a$ to a root $MOIm_p$ are named as $MOIm_1$, $MOIm_2$, ... $MOIm_p$ in order from $MOIm_1$.

(2) By a step S2 in FIG. 15, in the corresponding table, $MOIm_a$ is added to a BaseTojthLevel scope (i≦j), a WholeSubtree scope and an ithLevelOnly scope each of which BOI (Base Object Instance) is an $MOIm_i$ (1≦i≦p).
(example of generation of MOI)

Figure 16:
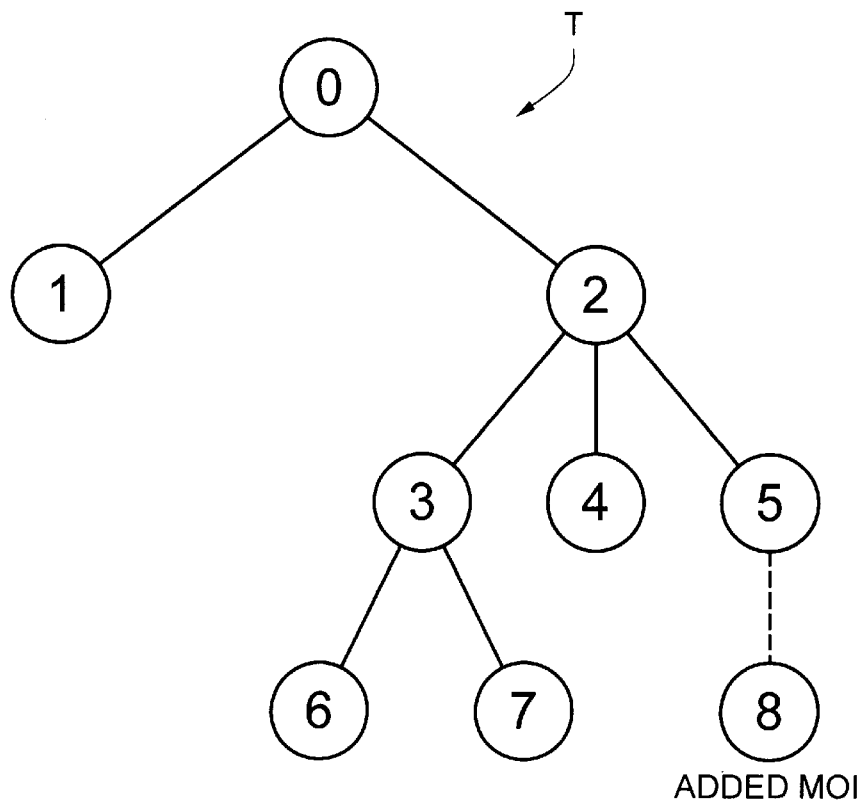
FIG. 16 is an example for renewal of the corresponding table in the case of deleting MOI.

An example of renewal, when $MOI_8(=m_a)$ is added as a child of $MOI_5(=m_1)$ to the naming tree T shown FIG. 16, will be described.

(1) step S1: A parent of $MOI_5$ is a 2nd (=$m_2$) line in a 5th (=$m_1$) row of which value is "1" in the matrix A. In the same way, a parent of $MOI_2$ is a 0th (=$m_3$) line in a 2nd (=$m_2$) row of which value is "1" in the matrix A. Because $MOI_0$ is a root, $MOIm_1=MOI_5$, $MOIm_2=MOI_2$ and $MOIm_3=MOI_0$ are roots.

(2) Step S2: $MOI_8(=m_a)$ is added to a BaseTojthLevel scope (1≦j), a WholeSubtree scope and a 1stLevelOnly scope each of which BOI (Base Object Instance) is $MOIm_1$. $MOI_8(=m_a)$ is added to a BaseTojthLevel scope (2≦j), a WholeSubtree scope and a 2ndLevelOnly scope each of which BOI (Base Object Instance) is $MOIm_2$. $MOI_8(=m_a)$ is added to a BaseTojthLevel scope (3≦j), a WholeSubtree scope and a 3rdLevelOnly scope each of which BOI (Base Object Instance) is $MOIm_3$. Namely, scope[8]=1 is added to above-mentioned scope, scope[8]=0 is added to other scope.
(deletion of MOI)

Figure 17:
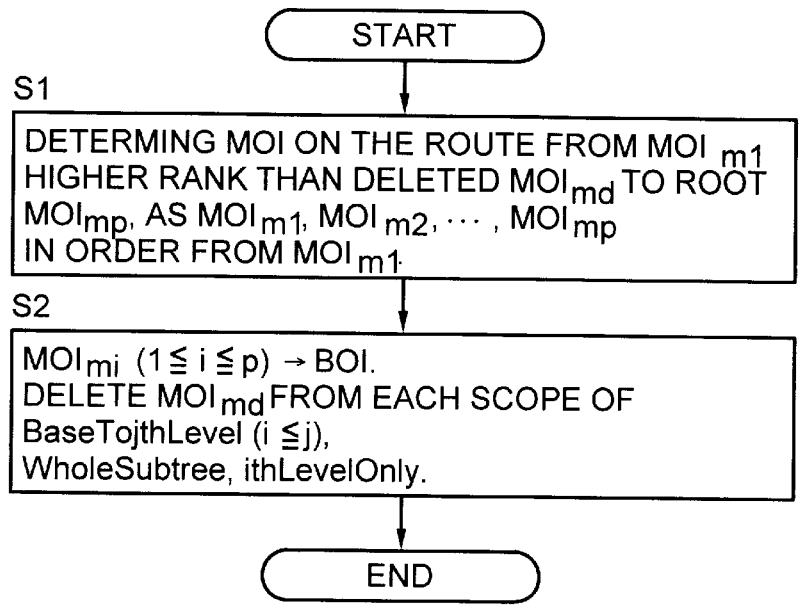
FIG. 17 is a flow chart for renewal of the corresponding table in the case of deleting MOI.

FIG. 17 shows a step for deleting the table when an old $MOIm_d$ is deleted from the naming tree.

(1) In step S1 in FIG. 17, all MOI on a route from a $MOIm_1$ upper than $MOIm_d$ to a root $MOIm_p$ are named as $MOIm_1$, $MOIm_2$, ... $MOIm_p$ in order from $MOIm_1$.

(2) By step S2 in FIG. 17, in the corresponding table, $MOIm_d$ is deleted from a BaseTojthLevel scope (i≦j), a WholeSubtree scope and an ithLevelOnly scope each of which BOI (Base Object Instance) is an $MOIm_i$ (1≦i≦p).
(example of deletion of MOI)

Figure 18:
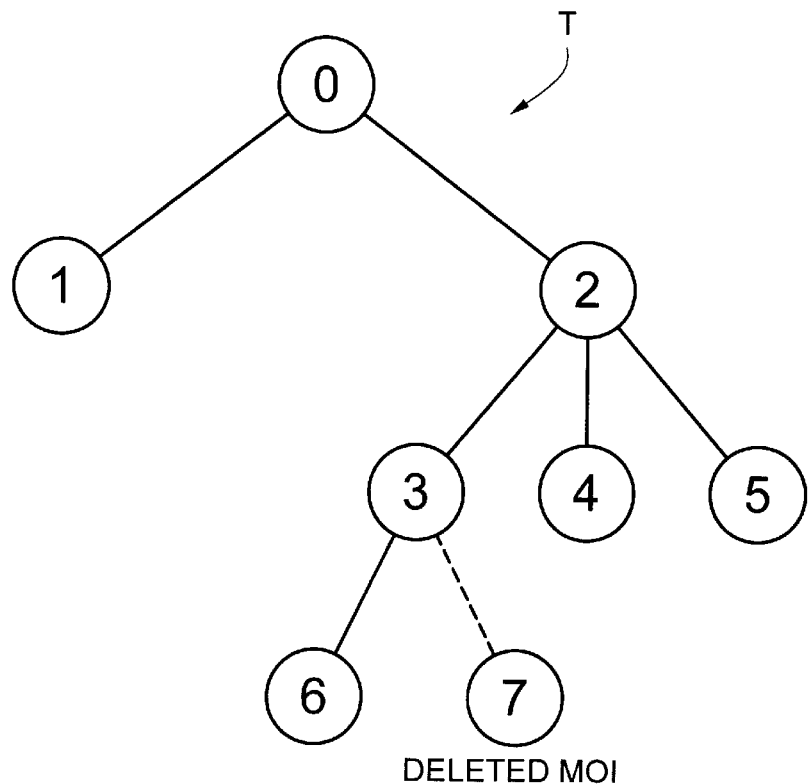
FIG. 18 is an example for renewal of the corresponding table in the case of deleting MOI.
Figure 19:
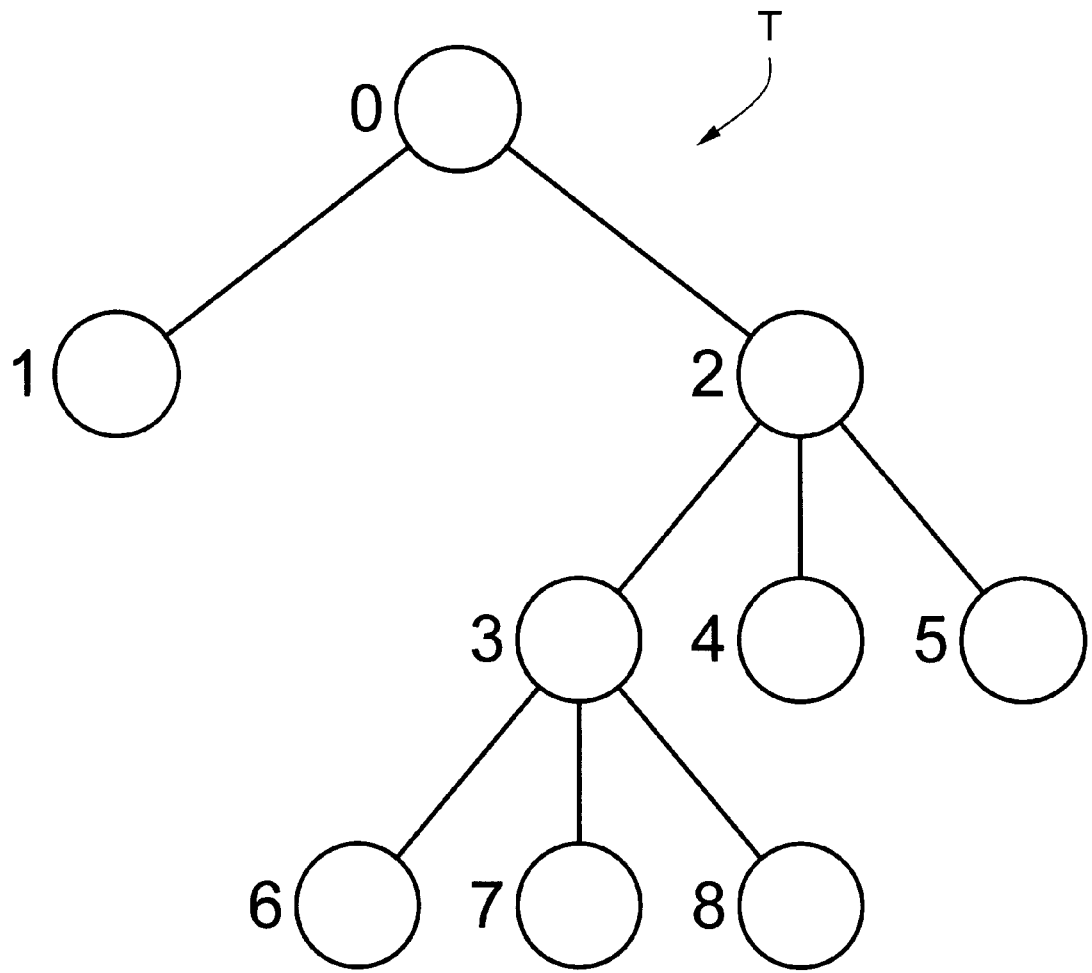
FIG. 19 shows a naming tree.

An example of deletion, when $MOI_7$ which is a child of $MOI_3$ is deleted from the naming tree T shown FIG. 18, will be described.

(1) step S1: A parent of $MOI_7$ (=$m_d$) is a 3rd (=$m_1$) line in a 7th (=$m_d$) row of which value is "1" in the matrix A. In the same way, a parent of $MOI_3$ (=ml) is a 2nd (=$m_2$) line in a 3rd (=$m_1$) row of which value is "1" in the matrix A. Because $MOI_0$ is root, $MOIm_1=MOI_5$, $MOIm_2=MOI_2$ and $MOIm_3=MOI_0$ are root.

(2) Step S2: $MOI_7(=M_d)$ is deleted from BaseTojthLevel scope (1≦j) WholeSubtree scope and 1stLevelOnly scope each of which BOI (Base Object Instance) is $MOIm_1$. $MOI_7(=m_d)$ is deleted from BaseTojthLevel scope (2≦j), WholeSubtree scope and 2ndLevelOnly scope each of which BOI (Base Object Instance) is $MOIm_2$. $MOI_7(=m_d)$ is deleted from BaseTojthLevel scope (3i≦j), WholeSubtree scope and 3rdLevelOnly scope each of which BOI (Base Object Instance) is $MOIm_3$. Namely, scope[7]=1 is deleted from above-mentioned scope, scope[7]=0 is deleted from other scope.

The above-mentioned process is generally carried out by a computer. Namely, a computer carries out the process by reading input data which were programed data of the process and readable data to the computer and stored in a recording medium. Then the computer functions as an apparatus which carries out the above-mentioned process.
(effect of the invention)

The present invention possesses the following advantages over the prior art.

(1) The calculation amount is less than the prior art of access control using the management operation as an access unit.

(2) Fine access control using the managed instance object as the access unit is possible.

Further, by converting to the index from the identification name of MOI, it is possible to unify the bit length of the identification name and thus quick access to MOI is possible. By the enumeration process, it is possible to simply and clearly indicate MOI which are included within scope that can be designated by the management operation and it is also possible to simply and clearly indicate the object to be protected or opened. By updating the corresponding table, it is possible to simply and easily adapt to a change of MOI which occurs based on the addition or deletion of MOI on the naming tree. Further, by calculating a logical product in each bit of "scope[ ]" and "targets[ ]", it is possible to simply and easily obtain the intersection between scope and the protected object or the opened object.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented method for converting, in an OSI (Open System Interconnection) network name tree, an MOI (Managed Object instance) identification name, into an index, wherein "n" denotes a number of MOI in the OSI network name tree, "m"=|r|÷N, "[x]" denotes an integer rounded up from a value x and "XOR" denotes an exclusive OR, said method comprising the steps of:

dividing an MOI identification name into m blocks Bi (1≦i ≦m), wherein each block N includes bits, N=$\log_2$n, wherein a value 0"is applied to an m-th block $B_m$ if an insufficiency of a bit occurs in the m-th block $B_m$;

performing an XOR of a j-th bit $N_{ij}$ (1≦j N) of each block $B_j$ as $C_j=b_{1j}$ XOR $b_{2j}$XOR $b_{3j}$ ... XOR $b_{mj}$;

making an N bit sequence $C_1C_2C_3 \ldots C_N$ as an index of an MOI identification name by sorting said calculated value $C_j$ from $C_1$ to $C_N$;

allotting the index of the MOI identification name to a corresponding MOI contained in the OSI network name tree; and performing management operations on at least one MOI by referencing at least one allotted index.

2. A computer-implemented method, in an OSI (Open System Interconnection) network name tree, for enumeration of a scope, comprising the steps of:

assigning each scope, all of which may be designated in a management operation, an arrangement "scope[ ]" of which size is n and which represents a MOI (Managed Object Instance) included in the scope, wherein scope[i]=1 if an $MOI_i$ is included in the scope, and scope[i]=0 if an $MOI_i$ is not included in the scope; and allowing management operations to be performed on at least one MOI if scope [i]=1.

3. A computer-implemented method for adding at least one $MOIm_a$ (Managed Object Instance node) to an OSI (Open System Interconnection) network name tree and enumeration of a scope, comprising the steps of:

adding the at least one $MOIm_a$ to a BaseTojthLevel scope, wherein (i≦j), of which BOI (Base Object Instance) is an $MOI_i$ (1≦i≦p), a WholeSubtree scope and an ith-LevelOnly scope, wherein MOI on a route from a $MOIm_1$ upper than $MOIm_a$ to a root $MOIm_p$ in the $MOIm_a$ to be added is sorted from $MOIm_1$ as $MOIm_1$, $MOIm_2, \ldots MOIm_p$; and performing management operations by referencing the at least one added $MOIm_a$.

4. A computer-implemented method for deleting a $MOIm_d$ (Managed Object Instance node) from an OSI (Open System Interconnection) network name tree and enumeration of a scope, comprising the steps of:

deleting the at least one $MOIm_d$ from a BaseTojthLevel scope. wherein (i≦j), of which BOI (Base Object Instance) is an $MOI_{i\ a}$(1≦i≦p), a WholeSubtree scope and an ithLevelOnly scope, wherein MOI on a route from a $MOIm_1$ upper than $MOIm_d$ to a root $MOIm_p$ in the $MOIm_d$ to be deleted is sorted from $MOIm_1$ as $MOIm_1$, $MOIm_2, \ldots MOIm_p$, and performing management operations wherein the at least one $MOIm_d$ is not considered.

5. A computer-implemented method, in an OSI (Open System Interconnection) network name tree, for enumeration of a target, comprising the steps of:

assigning each target MOI (Managed Object Instance), which is a protect target to be protected from an authority or an open target to be opened to an authority, an arrangement of "targets[ ]" for which size=n and which represents the target MOI wherein, targets[i]=1 if an $MOI_i$ is protected or opened, and targets[i]=0 if an $MOI_i$ is not protected and not opened; and allowing management operations to be performed on at least one target MOI if targets[i]=0.

6. A computer-implemented method, in an OSI (Open System Interconnection) network name tree, for enumeration of a scope, comprising the steps of:

making a correspondence table wherein, regarding each scope, all of which can be designated in a management operation, a table corresponding to a MOI (Managed Object Instance) included in the scope is made; and allowing access to perform management operations on at least one MOI (Managed Object Instance) by referring to the correspondence table.

7. The computer-implemented method for enumeration according to claims 2, 3, 4, or 6, further including detecting an intersection, wherein the intersection between a management object and a protect object is obtained by calculating for each bit a logical product between the 'scope [ ]" and a denial of a "targets[ ],"

wherein the denial of "targets[ ]"="targets[ ]".

8. The computer-implemented method for enumeration according to claims 2, 3 or 4, further including detecting an intersection wherein, an intersection between a management object and a protect object is obtained by calculating for each bit a logical product between the "scope[ ]" and the "targets[ ],"

wherein the denial of "targets[ ]"="targets[ ]".

9. The computer implemented method for enumeration according to claims 2, 3, 4, or 6, further including access control by using MOI as an access unit, comprising:

calculating for each bit a logical product between a denial of each "targets[ ]," and the "scope[ ],"

wherein the denial of "targets[ ]"="targets[ ]", and allowing only an MOI of which scope[i] is 1 based on said calculation.

10. The computer-implemented method for enumeration according to claims 2, 3, 4, or 6, further including access control by using MOI as an access unit comprising:

calculating for each bit a logical product between each "targets[ ]" in an item permission rule and the "scope[ ]", wherein the item permission rule is defined as targets[i]=1 if an $MOI_i$ is protected or opened, target [i]=0 if an $MOI_i$ is not protected and not opened, and allowing only an MOI of which scope[i] is 1 based on said calculation.

11. A computer-implemented method for converting, in an OSI (Open System Interconnection) network name tree, each one of at least one MOI (Managed Object Instance) identification name, each one of the at least one MOI identification name comprised of at least one bit, into an index, wherein n=a number of MOI in the OSI network name tree, |r|=a number of bits representing each one of the at least one MOI identification name, where N=$\log_2 n$, m=|r|/N, and XOR=an exclusive OR operation, comprising the steps of:

dividing each one of the at least one MOI identification name into m blocks $B_i$(1≦i≦m), wherein each block $B_i$ includes N bits, wherein a null value is applied to an m-th block $B_m$ if there is an insufficient number of bits to fill the m-th block $B_m$;

calculating an index for each one of the at least one MOI identification names;

allotting each calculated index to each corresponding MOI contained in the OSI network name tree, and performing management operations on at least one MOI by referencing at least one allotted index.

12. The computer-implemented method for converting MOI identification names into indexes according to claim 11, wherein the index is calculated by performing an XOR of a j-th bit $b_{ij}$ (1≦j≦N) of each block Bj, so that $C_j=b_{ij}$ XOR $b_{2j}$ XOR $b_{3j} \ldots$ XOR $b_{mj}$, thereby making an N bit sequence $C_1C_2C_3 \ldots C_N$ by arranging said calculating value $C_j$ from $C_1$ to $C_N$.

13. A computer-implemented method for creating and utilizing a scope and MOI (Managed Object Instance)

correspondence table of an OSI (Open System Interconnection) network name tree for determining MOI access privileges, wherein D is a depth of the OSI network name tree, A is a connection matrix denoting the OSI network name tree, $A_{ij}$ is an element on an i-th line and j-th row of the A connection matrix, $A_{ij}=1$ when $MOI_i$ with index i is a parent of $MOI_j$, $A_{ij}=0$ when $MOI_i$ with index i is not a parent of $MOI_j$, $A^0=E$, $A^i=A*A^{(i-1)}(i\geq 1)$, $C^i=A^0+A^1+A^2+\ldots+A^i$, comprising the steps of:

for each BOI (Base Object Instance) scope of the OSI network name tree, calculating $A^i$ and $C^i$ until $i \geq D$, thereby creating a set MOI included for each BOI scope;

using the set of MOI included for each BOI scope to create a scope and MOI correspondence table that can be designated in a management operations and allowing access to at least one MOI for performing management operations by referring to the scope and MOI correspondence table.

14. The computer-implemented method for creating and utilizing a scope and MOI correspondence table according to claim 13, wherein the step of calculating $A^i$ and $C^i$ further includes the steps of:

step 1, calculating $A^x$ and $C^x$ until $A^{n+1}=0$, wherein $(1 \leq x \leq D)$;

step 2, initializing i=1 and $A^i=A*A^{(i-1)}=A$;

step 3, when MOI having index j is indicated as $MOI_j$, j=0;

step 4, if $MOI_j$ satisfies a condition indicated in step 5, perform step 8 otherwise, perform step 5;

step 5, when ($a^i_{jk}$) indicates an element in the j-th line of $A^i$ or an element of which line is $MOI_j$ of a matrix $A^i$, if ($a^i_{jk}$)=0 for all k, perform step 12, otherwise perform step 6;

step 6, an ithLevelOnly scope of which BOI=$MOI_j$ includes $MOI_k$, wherein ($a^i_{jk}$)=1;

step 7, if ($C^i_{jk}$) indicates an element in a j-th line of $C^i$ or an element of which line is $MOI_j$ of a matrix $C^i$, a BaseToithLevel scope of which BOI is $MOI_j$ includes $MOI_k$, wherein ($C^i_{jk}$)=1;

step 8, j=j+1;

step 9, if j<n, perform step 4, otherwise perform step 10;

step 10, i=i+1, $A^i=A^{i+1}$, $C^i=C^{i+1}$;

step 11, if i<D+1 perform step 3, otherwise the scope and MOI correspondence table is created; and step 12, a WholeSubtree scope of which BOI is MOIj treated as BaseTo(i-1)thLevel scope, perform step 8.

15. The computer-implemented method for creating and utilizing a scope and MOI correspondence table according to claim 13, wherein the scope and MOI correspondence table is updated when a new $MOIm_a$ is added to the OSI network name tree, the new $MOIm_a$ is added to a BaseTojthLevel scope (i≦j) of which a BOI is an $MOI_i$ (1≦i≦p), a WholeSubtree scope and an ithLevelOnly scope, wherein MOI on a route from a $MOIm_1$ upper than $MOIm_a$ to a root $MOIm_p$ in the $MOIm_a$ to be added is sorted from $MOIm_1$ as $MOIm_1$, $MOIm_2, \ldots MOIm_p$.

16. The computer-implementing method for creating and utilizing a scope and MOI correspondence table according to claim 13, wherein the scope and MOI correspondence table is updated when a $MOIm_d$ is deleted from the OSI network name tree, the $MOIm_d$ is deleted from a BaseTojthLevel scope (i<j) of which BOI is an $MOI_i$ (1≦i≦p), a WholeSubtree scope and an ithLevelOnly scope, wherein MOI on a route from a $MOIm_1$ upper than $MOIm_d$ to a root $MOIm_p$ in the $MOIm_d$ to be deleted is sorted from $MOIm_1$ as $MOIm_1, MOIm_2, \ldots MOIm_p$.

17. The computer-implemented method for creating and utilizing a scope and MOI correspondence table according to claim 13, wherein a scope of size n, representing an MOI included in the BOI scope, includes scope[i] being assigned a value if a $MOI_i$ is included in the BOI scope and scope[i] being set to an inverse of the value assigned to scope[i] when an $MOI_i$ is not included in the BOI scope.

18. The computer-implemented method for creating and utilizing a scope and MOI correspondence table according to claim 13, wherein a targets of size n, representing each targets MOI which is a protect target to be protected from an authority or an open target to be opened to an authority and a target MOI, includes targets[i] being assigned a value if a $MOI_i$ is protected or opened and targets[i] being set to an inverse of the value assigned to scope[i] when a $MOI_i$ is not protected and not opened.

19. A computer-implemented method for detecting an intersection between a management object and a protect object in an OSI (Open System Interconnection) network name tree and for allowing access to only those management objects which are not denied access, comprising the steps of:

calculating a denial of a BOI (Base Object Instance) scope by inverting each bit in a scope; and determining the intersection between the management object and the protect object in the OSI network name tree by performing a bit wise logical product operation between the denial of the BOI scope and a targets.

20. A computer-implemented access control method in an OSI (Open System Interconnection) network name tree, comprising the steps of:

calculating a denial of a BOI (Base Object Instance) scope by inverting each bit in a scope;

determining an intersection between a management object and a protect object in the OSI network name tree by performing a bit wise logical product operation between the denial of the BOI scope and a targets; and allowing access to only those management objects which are not denied after the bit wise logical product operation is performed.

* * * * *